United States Patent
Bogusz et al.

(10) Patent No.: US 10,659,723 B2
(45) Date of Patent: May 19, 2020

(54) DE-INTERLACING DATA ARRAYS IN DATA PROCESSING SYSTEMS

(71) Applicant: Arm Limited, Cambridge (GB)

(72) Inventors: Michal Karol Bogusz, Cambridge (GB); Piotr Tadeusz Chrobak, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/810,090

(22) Filed: Nov. 12, 2017

(65) Prior Publication Data

US 2018/0146158 A1 May 24, 2018

(30) Foreign Application Priority Data

Nov. 22, 2016 (GB) .................................. 1619708.9

(51) Int. Cl.
 *H04N 7/01* (2006.01)
 *G09G 5/00* (2006.01)
 *G06T 3/40* (2006.01)
 *H04N 5/262* (2006.01)

(52) U.S. Cl.
 CPC ............... *H04N 7/012* (2013.01); *G06T 3/40* (2013.01); *G09G 5/00* (2013.01); *H04N 5/2628* (2013.01)

(58) Field of Classification Search
 CPC ......... H04N 7/012; H04N 5/2628; G06T 3/40
 USPC ........ 382/298, 296; 348/448, 446, 469, 550; 345/660
 See application file for complete search history.

(56) References Cited

U.S. PATENT DOCUMENTS

| | | | | |
|---|---|---|---|---|
| 6,219,104 | B1 * | 4/2001 | Shirahama | G06T 3/4007 348/458 |
| 2005/0248589 | A1 * | 11/2005 | Alpha | G06T 3/4084 345/660 |
| 2006/0039590 | A1 * | 2/2006 | Lachine | G06T 3/403 382/128 |
| 2008/0204598 | A1 * | 8/2008 | Maurer | G11B 27/034 348/584 |
| 2008/0224983 | A1 * | 9/2008 | Lee | G09G 3/3648 345/98 |
| 2013/0034309 | A1 | 2/2013 | Nystad | |

OTHER PUBLICATIONS

GB Combined Search and Examination Report dated May 9, 2017, GB Patent Application No. GB1619708.9.

* cited by examiner

*Primary Examiner* — Jefferey F Harold
*Assistant Examiner* — Omer Khalid
(74) *Attorney, Agent, or Firm* — Vierra Magen Marcus LLP

(57) ABSTRACT

A data processing system includes a scaler 18 operable to scale a received input data array to provide a scaled output version of the input data array. When it is desired to produce a de-interlaced and scaled output version of an input data array 21, 22, the input data array 21, 22 is provided to the scaler 18, and the scaler 18 scales the input data array 21, 22 so as to simultaneously de-interlace and scale the input data array and to produce a de-interlaced and scaled output version of the input data array.

11 Claims, 18 Drawing Sheets

DE-INTERLACING DATA ARRAYS IN DATA PROCESSING SYSTEMS

BACKGROUND

The technology described herein relates to data processing systems, and in particular to data processing systems that support and use interlaced video.

Interlacing is a commonly used technique in data processing systems for video data. Each video frame of the video data is effectively divided into two frames or "fields", namely an odd frame (odd field) and an even frame (even field). Each odd frame is made up of the odd lines of the corresponding original video frame and each even frame is made up of the even lines of the corresponding original video frame. Each video frame of the video data is propagated through the data processing system in the form of these two separate (odd and even) frames.

In order to display interlaced video, each of the odd and even frames is used to produce its own "full" frame for display. This is done by de-interlacing each of the odd and even frames, whereby the frame in question is interpolated to produce a "full" de-interlaced frame for display. Each de-interlaced frame is then provided to a display for display.

In this way, the frame rate at which the video data is displayed is doubled relative to the frame rate at which the video data is generated or decoded, without consuming extra bandwidth in the data processing system.

In data processing systems, it is often necessary to scale (upscale or downscale) data arrays, e.g. video frames, prior to the data arrays being displayed.

The Applicants believe that there remains scope for improvements to data processing systems.

BRIEF DESCRIPTION OF THE DRAWINGS

Various embodiments of the technology described herein will now be described by way of example only and with reference to the accompanying drawings, in which.

Like reference numerals are used for like components throughout the drawings, where appropriate.

DETAILED DESCRIPTION

Figure 1:
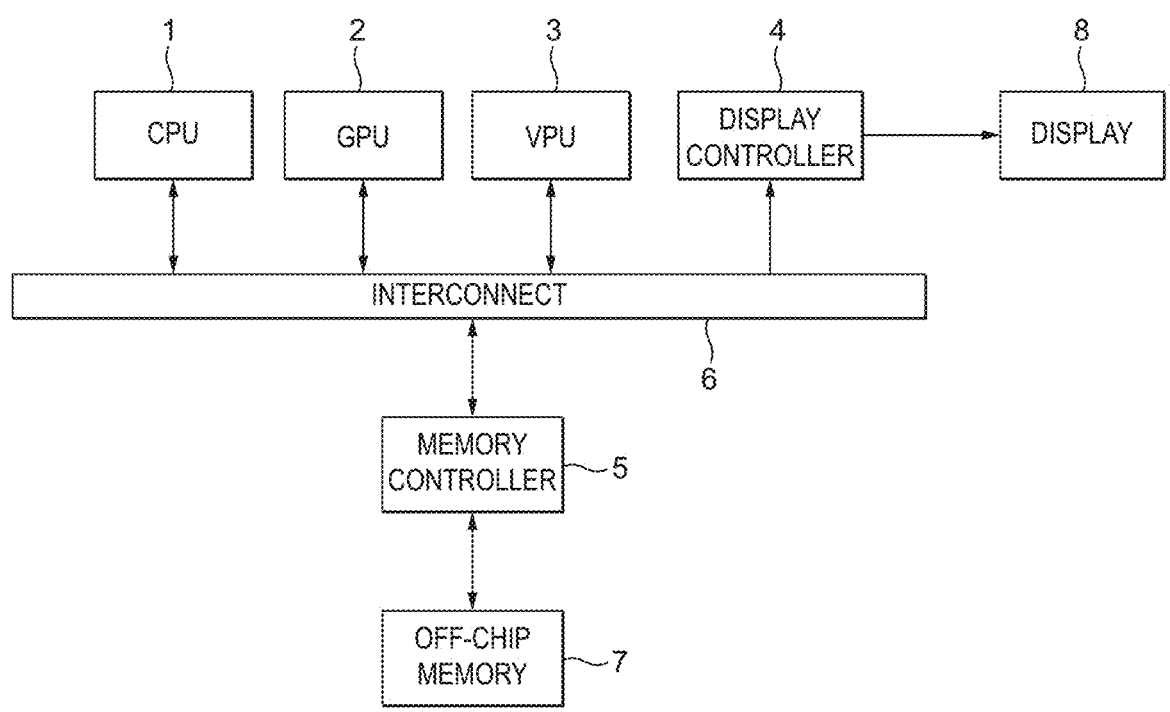
FIG. 1 shows schematically a data processing system in accordance with an embodiment of the technology described herein.

A first embodiment of the technology described herein comprises a method of operating a data processing system that includes a scaler operable to scale a received input data array to provide a scaled output version of the input data array, the method comprising:

when it is desired to produce a de-interlaced and scaled output version of an input data array:
  providing the input data array to the scaler; and
  the scaler scaling the input data array so as to simultaneously de-interlace and scale the input data array and to thereby produce a de-interlaced and scaled output version of the input data array.

A second embodiment of the technology described herein comprises a data processing system, the data processing system comprising:
  a scaler operable to scale a received input data array to provide a scaled output version of the input data array; and processing circuitry configured, when it is desired to produce a de-interlaced and scaled output version of an input data array, to provide the input data array to the scaler; and wherein the scaler is operable to scale a received input data array so as to simultaneously de-interlace and scale the input data array, to thereby produce a de-interlaced and scaled output version of the input data array.

The technology described herein relates to the de-interlacing and scaling of input data arrays. The Applicants have recognised that when it is desired to both de-interlace and scale an input data array, these two operations can be (and in an embodiment are) performed simultaneously (i.e. in a single pass) by appropriate scaling using a single scaler.

This is in contrast with known methods wherein two separate stages are provided in the data processing system and used for these two operations, e.g. a de-interlacing stage and a scaling stage. Thus the operation in the manner of the technology described herein can reduce the hardware requirements (chip area) of the data processing system.

This is also in contrast with known methods wherein de-interlacing and scaling of an input data array is performed as a two-pass operation, e.g. where a de-interlaced version of the input data array is written out to memory, and then read in from memory for scaling. Thus the operation in the manner of the technology described herein can also reduce the bandwidth and power consumption requirements of the data processing system.

It will be appreciated, therefore, that the technology described herein provides an improved data processing system.

The scaler of the data processing system can be any suitable and desired scaler that is operable to scale an input data array to provide a scaled output data array. Thus it can be any suitable and desired scaling unit, scaling engine, scaling pipeline, etc.

In an embodiment, the scaler that is used to scale the input data array comprises a scaler of a given processing unit (processor) of the overall data processing system. Thus, in an embodiment, the data processing system includes a processor that includes a scaler, and the input data array to be de-interlaced is provided to the scaler of that processor for scaling, e.g. by data flow controller processing circuitry (e.g. a multiplexer or data-flow controller) and/or processing pipeline processing circuitry (e.g. a display layer pipeline or processing pipeline) of that processor. Such a processor can be any suitable and desired processor (processing unit) of a data processing system that includes a scaler. In an embodiment it is a display controller, a graphics processor (graphics processing unit (GPU)), a video processor (video processing unit (VPU)), or an image signal processor (ISP). In an embodiment it is a display controller (for a display of the data processing system).

In an embodiment, the mode of operation of the processing unit (e.g. the display controller) is controlled by an application, e.g. running on a host processor, in an embodiment by the application generating instructions which are interpreted by a driver for the processing unit (that is running on the host processor) to generate appropriate commands to the processing unit to operate as required by the application. In an embodiment, where the application requires an input data array to de-interlaced and scaled, then the application generates appropriate instructions which are interpreted by the driver to generate appropriate commands to the processing unit (e.g. display controller) to operate in the manner of the technology described herein, i.e. to perform simultaneous de-interlacing and scaling using the scaler.

The scaler may be implemented as desired, e.g. and in an embodiment, as appropriate processing circuitry (either that is programmable to perform the desired scaling operation, and/or that comprises fixed function scaling circuitry operable to perform the scaling operation).

The input data array to be de-interlaced can be any desired and suitable input data array that may need to be de-interlaced and scaled by the data processing system.

The input data array can represent any suitable and desired data array, but in an embodiment comprises an image, e.g., and in an embodiment, a frame to be displayed. In an embodiment, the input data array is an even or an odd (video) frame (or "field") to be de-interlaced (e.g., and in an embodiment by a display controller) for display.

The input data array is in an embodiment one such data array (frame) from a sequence of data arrays (frames), e.g. and in an embodiment from a sequence of interleaved even and odd (video) frames (fields) to be de-interlaced for display.

The input data array should (and in an embodiment does) comprise an array of data positions for which respective data values are stored, and should (and in an embodiment does) have a given horizontal and vertical size (in terms of the number of data positions in the horizontal and vertical directions for the input data array). Thus, the input data array in an embodiment comprises plural columns of data positions and plural rows (lines) of data positions.

Correspondingly, the data values for the data positions of the data array can be any suitable and desired data values. In an embodiment, the data values represent colour values such as RGB or YUV colour values (where the data array is an image, e.g. for display), but they could be other data values for other types of data array, as and if desired.

The input data array can be generated as desired. For example the data array(s) may be generated by a processing unit of the overall data processing system, such as by being appropriately rendered and stored into a memory (e.g. frame buffer) by a graphics processor of the data processing system. Additionally or alternatively, the data array(s) may be generated by being appropriately decoded and stored into a memory (e.g. frame buffer) by a video codec (video processor). Additionally or alternatively, one or more data arrays may be generated by a digital camera image signal processor (ISP), or other image processor. The data array(s) may be, e.g., for a game, a demo, a graphical user interface (GUI), a GUI with video data (e.g. a video frame with graphics "playback" and "pause" icons), etc.

Where the input data array is one of a pair of even and odd (video) frames (fields) to be de-interlaced for display, then each of the even and an odd (video) frames (fields) may be stored in a respective frame buffer in memory, e.g. main memory, of the data processing system.

The input data array to be de-interlaced in an embodiment corresponds to and/or is generated from a corresponding initial data array, e.g. an initial frame. The initial data array (frame) is in an embodiment a "full" data array (frame) for display, e.g. where the input data array in an embodiment comprises every other row (line) (e.g. each of the odd or even rows (lines)) of the initial data array (frame). The initial data array (frame) is in an embodiment one such data array (frame) from a sequence of data arrays (frames) for display.

Thus, in an embodiment, there is a sequence of initial data arrays, e.g. a sequence of (video) frames for display, which is generated in the form of and/or which is used to generate a sequence of data arrays (frames) to be de-interlaced, e.g. a sequence of interleaved even and odd (video) frames (fields) to be de-interlaced. One or more or each of the sequence of data arrays (frames) to be de-interlaced may be de-interlaced and scaled in the manner of the technology described herein.

In the technology described herein, the scaler scales the input data array so as to simultaneously de-interlace and scale the input data array and to produce a de-interlaced and scaled output version of the input data array. That is, the scaler performs a single scaling operation in order to both de-interlace and scale the input data array. Thus, the de-interlaced and scaled output version of the input data array (the output data array) is not merely (is other than) a de-interlaced version of the input data array, but is a scaled version of a de-interlaced version of the input data array.

The de-interlaced and scaled output data array that is produced from the input data array will comprise an appropriately de-interlaced and scaled version of the input data array. Thus, where the input data array is an even or an odd video frame (or "field") to be de-interlaced for display, the output data array will comprise a de-interlaced and scaled frame for display.

The scaling operation that is performed on the input data array to provide the de-interlaced and scaled output data array can comprise any suitable scaling operation.

In an embodiment, the scaling operation uses interpolation (or "filtering") in order to de-interlace and scale the input data array. Any suitable type of interpolation may be used, such as for example, nearest neighbour interpolation, bilinear interpolation, bicubic interpolation, polyphase interpolation, and the like. In an embodiment, the scaler uses polyphase interpolation (polyphase filtering) to scale the input data array.

In an embodiment, the scaling operation scales the input data array in one direction (dimension), i.e. in either the horizontal or vertical direction. However, the technology described herein is equally applicable to arrangements in which an input data array is being scaled in both directions (dimensions) (e.g. both horizontally and vertically). Thus the scaling operation that is performed on the input data array may be to scale the input data array in one or both directions (horizontal and vertical).

In an embodiment, the scaler is operable to scale the input data array by (separately) scaling each of plural sets (subsets) of data positions of the input data array, e.g. and in an embodiment, so as to produce a scaled output version of each set (sub-set) of data positions. Accordingly, the de-interlaced and scaled output version of the input data array in an embodiment comprises scaled output versions of each of plural input sets (sub-sets) of data positions of the input data array.

Each of the plural input sets of data positions of the input data array may have any suitable size and shape. However, in an embodiment, when scaling the input data array in a particular (horizontal or vertical) direction, the scaling operation is performed on a column-by-column or row-by-row (line-by-line) basis. That is, each input set (sub-set) of data positions in an embodiment comprises a column or a row of data positions (i.e. a set of data positions that is one data position high and many data positions long or vice versa), and each input column or each input row of data positions of the input data array is in an embodiment (separately) scaled so as to produce a scaled output version of that column or row of data positions (where each scaled output column or row in an embodiment comprises a set of data positions that is one data position high and many data positions long or vice versa). Accordingly, the de-interlaced and scaled output version of the input data array in an embodiment comprises scaled output versions of each of plurals input columns or rows of data positions of the input data array.

For each input set (e.g. column or row) of data positions that will (and in an embodiment does) comprise some first (integer) number (e.g. N) of data positions, a corresponding scaled output version of the input set (column or row) comprising some second, in an embodiment different, (integer) number (e.g. M) of data positions is in an embodiment produced. The second number of data positions (M) may be greater than or less than the first number of data positions (N), i.e. the input set (e.g. column or row) of data positions may be upscaled or downscaled.

In an embodiment, when scaling the input data array, a data value (e.g. colour value) is determined for each data position of the de-interlaced and scaled output version of the input data array (for each data position of the output data array). This may be performed as desired. In an embodiment, for each data position of each output set of data positions, the data value or values of one or more of the data positions of the corresponding input set of data positions is used to determine the data value in question.

The data value or values of any number of data positions of the input data array may be used to determine the data value for each data position of the output data array. For example, the data value of a single data position of the input data array may be used in respect of a, some or each data position of the output data array (this may be the case, e.g. when using nearest neighbour interpolation). Alternatively, the data values of plural data positions of the input data array may be used in respect of a, some or each data position of the output data array (this may be the case, e.g. when using bilinear interpolation, bicubic interpolation, polyphase interpolation, and the like).

Where the data values of plural input data positions are used to determine the data value of an output data position, the data values of any plural number of input data positions may be used. In an embodiment, the scaler has some fixed number of filter taps (which may be, e.g., defined by the hardware configuration of the scaler), and the data values of that number of input data positions are used to determine the data value for each output data position in the scaling operation.

The particular data position or positions of the input data array that is or are used to determine the data value for each output data position may be selected as desired. In an embodiment, the input data position or positions that is or are used in respect of each output data position correspond to one or more nearest neighbour data positions.

The input data value or values may be used to determine the data value for each output data position in any suitable manner. For example, where the data value of a single input data position is used in respect of an output data position, the data value of the input data position may be used for the data value of the output data position.

Where the data values of plural input data positions are to be used to determine the data value for an output data position, then the plural data values may be combined to generate the output data value in any suitable manner. For example, the plural data values may be averaged to generate the output data value in question.

However, in an embodiment, where the data values of plural input data positions are to be used to determine the data value for an output data position, a weighted average of the plural data values is determined and in an embodiment used for the output data value. In an embodiment, a set of coefficients is determined, and is used to weight the contributions from each of the plural input data values to the output data value. The particular values of the coefficients may be selected as desired, e.g. and in an embodiment, in accordance with the particular interpolation (filtering) technique that is being used.

In an embodiment, the weighting (e.g. the set of coefficients) is determined on the basis of a phase value associated with the output data position in question. The phase is in an embodiment an indication of how "aligned" the output data position in question is to the set of input data positions.

In an embodiment, an output data position has an associated phase value of zero where that output data position is aligned with one of the data positions of the input (set of) data positions. Where an output data position is not (is other than) aligned with one of the data positions of the input (set of) data positions, then the output data position will in an embodiment have some non-zero phase associated with it.

Thus, for example, where each input set of data positions to be scaled comprises a row or column of data positions of the input data array (and where each output set of data positions comprises a scaled row or column of data positions), an output data position in an embodiment has a phase value of zero where that output data position has a position in the output row or column of data positions that is the same as the position of one of the input data positions in the row or column of input data positions. This would happen, for example, where the overall scaling ratio is precisely one. Where an output data position does not have (has other than) a position that is the same as the position of one of the data positions of the input row or column of data positions, then the output data position will have some non-zero phase associated with it.

As will be appreciated by those having skill in the art, by using a phase value to select the weighting (set of coefficients) that is used to combine the data values of plural input data positions to produce the data value for an output data position, the scaler can produce an improved output, e.g. with reduced aliasing artefacts and the like.

Thus, in an embodiment, each output data position of each output set of data positions has a phase value associated with it, where the phase value indicates how (spatially) aligned the output data position is in relation to the set of input data positions. The phase value associated with each output data position is used to determine the weighting (the set of coefficients) to be used to combine the data values of plural input data positions in order to determine the data value for the output data position.

The phase value is in an embodiment an integer, and is in an embodiment defined to be zero at (the centre of) each data position of the input set of data positions, and varies between zero and some maximum (integer) phase value between (the centres of) adjacent input data positions. The maximum phase value may be selected as desired. In an embodiment, the scaler is configured to have some (integer) number of phase values (NP) (which may, e.g., be defined by the hardware configuration of the scaler), and the phase value varies between zero and that number between (the centres of) adjacent input data positions. Other arrangements would be possible.

As will be appreciated by those having skill in the art, where each input set of data positions to be scaled comprises a row or column of data positions of the input data array (and where each output set of data positions comprises a scaled row or column of data positions), since both the set of input data positions and the set of output data positions has a regular periodic form, then the set of input data positions or phase values to be used for a given set of output data positions can be (and in an embodiment is) characterised by two scaling parameters, namely an initial (phase) offset together with a delta (phase) value.

The initial (phase) offset defines the distance (e.g. in units of phase) from one end of the input set (row or column) of data positions to (the centre of) the first output data position. The delta (phase) value defines the distance (e.g. in units of phase) between (the centres of) adjacent output data positions.

In an embodiment, the scaler is programmable in respect of one or more scaling parameters (e.g. and in an embodiment, in respect of the initial (phase) offset and/or the delta (phase) value), and the scaling operation can be controlled by appropriately programming the scaler in respect of the one or more scaling parameters.

As described above, the technology described herein lies in the realisation that when it is desired to both de-interlace and scale an input data array, these two operations can be (and in an embodiment are) performed simultaneously (i.e. in a single pass) by appropriate scaling using a single scaler. In this regard, the Applicants have furthermore recognised that simultaneous de-interlacing and scaling in the manner of the technology described herein can be achieved by appropriate selection (programming) of the scaling parameters. This accordingly means that simultaneous de-interlacing and scaling in the manner of the technology described herein can be implemented by making only relatively minor modifications to existing scalers, e.g. that may already be present in existing data processing systems.

Thus, in an embodiment, one or more scaling parameters (in an embodiment the initial input (phase) and/or the delta (phase) value) are determined (selected) for scaling the input data array so as to produce a de-interlaced and scaled output version of the input data array, and are in an embodiment provided to the scaler for the scaling operation. The scaler is in an embodiment configured to scale the input data array using the one or more determined scaling parameters so as to produce the de-interlaced and scaled output version of the input data array.

Accordingly, in an embodiment, when it is desired to produce a de-interlaced and scaled output version of an input data array, the scaler is configured, in an embodiment with one or more scaling parameters, such that when the scaler performs a (single) scaling operation for the input data array, the scaler will produce a de-interlaced and scaled version of the input data array. The input data array is in an embodiment then provided to the scaler, and the scalar scales the input data array so as to produce the de-interlaced and scaled output version of the input data array.

The one or more scaling parameters may be selected as desired so as to produce an appropriately de-interlaced and scaled output version of the input data array.

It should be noted in this regard, that when performing de-interlacing, simply upscaling the input array by a factor of two would not result in an appropriately de-interlaced data array. This is because the sequence of data arrays (frames) to be de-interfaced in an embodiment comprises interleaved even frames (fields) comprising only the even lies of an initial (original) data array and odd frames (fields) comprising only the odd lies of the initial data array, so that simply upscaling each data array (frame) in turn would result in flickering of the displayed image, whereby the displayed image would appear to jump up and down from frame to frame. Equally, where the initial (original) data array (frame) comprises an odd number of lines, the resulting even and odd frames (fields) will comprise different numbers of lines, and so will require different levels of scaling to produce equally sized (de-interlaced) output arrays.

However, the Applicants have recognised that this can be addressed by appropriate selection (programming) of the one or more scaling parameters, and in particular by appropriate selection (programming) of the initial (phase) offset.

Thus, in an embodiment, the one or more scaling parameters (in an embodiment the initial (phase) offset) are selected so that the de-interlaced and scaled output version of the data array (the output array) has the same size and position irrespective of whether the input data array comprises an odd frame (field) or an even frame (field) and/or irrespective of whether the initial data array comprises an odd or an even number of rows (lines). This beneficially avoids problems with flickering.

In an embodiment, this is achieved by selecting the one or more scaling parameters (and in particular the initial (phase) offset) depending on whether the input data array comprises an odd frame (field) or an even frame (field), where the one or more scaling parameters (in an embodiment the initial (phase) offset) are in an embodiment selected to be different for odd and even frames.

In an embodiment the one or more scaling parameters (and in an embodiment one or both of the initial (phase) offset and the delta (phase) value) are determined (selected) based on the scaling ratio, that is, the ratio of the (vertical and/or horizontal) size of the de-interlaced and scaled output data array to the (vertical and/or horizontal) size of a de-interlaced version of the input data array (or correspondingly the ratio of the (vertical and/or horizontal) size of the de-interlaced and scaled output array to the (vertical and/or horizontal) size of the initial (original) input data array). This is in an embodiment done so as to implement the scaling part of the simultaneous de-interlacing and scaling operation of the technology described herein. In an embodiment, the scaling ratio is used to determine both the initial (phase) offset and the delta (phase) value.

However, it should be noted that this is not achieved simply by multiplying the one or more scaling parameters that would otherwise be used for de-interlacing (without scaling) by the scaling ratio. On the contrary, the Applicants have recognised that simultaneous de-interlacing and scaling in the manner of the technology described herein requires a non-trivial selection of the one or more scaling parameters, and in particular a non-trivial selection of the initial (phase) offset.

In an embodiment, where the input data array comprises an odd frame (field) to be de-interlaced and scaled, then the scaling parameters used in the scaling operation are selected to be:

$$\text{delta\_phase} = \frac{1}{2} \cdot \text{scaling\_ratio} \cdot NP, \text{ and}$$

$$\text{initial\_phase} = \frac{1}{4} \cdot NP + \frac{1}{2} \cdot \text{scaling\_ratio} \cdot NP,$$

where NP is the number of filter phases of the scaler.

Similarly, in an embodiment, where the input data array comprises an even frame (field) to be de-interlaced and scaled, then the scaling parameters used in the scaling operation are selected to be:

$$\text{delta\_phase} = \frac{1}{2} \cdot \text{scaling\_ratio} \cdot NP, \text{ and}$$

-continued
$$\text{initial\_phase} = -\frac{1}{4} \cdot NP + \frac{1}{2} \cdot \text{scaling\_ratio} \cdot NP.$$

It will be appreciated from the above that for even frames, the initial (phase) offset may be negative. Thus, according to an embodiment, the (scaler of the) data processing system is configured to be able to handle negative values of initial (phase) offset. This then facilitates appropriate simultaneous de-interlacing and scaling for even frames (fields). This may be achieved as desired, e.g. by configuring the data processing system to be able to handle a signed representation of the initial (phase) offset (e.g. by configuring the data processing system to be able to handle an additional bit, and using the bit to indicate whether the value of the initial (phase) offset is positive or negative).

The Applicants have furthermore recognised that it can often be necessary to rotate (e.g. by 90°, 180° or 270°) and/or flip (e.g. horizontally and/or vertically) an input data array prior to the data array being provided to a display for display. This is common, for example, in modern mobile devices such as smartphones, tablets, and the like, e.g. where the image displayed on the display is rotated when the mobile device is itself rotated.

Where it is desired to both de-interlace and rotate and/or flip an input data array for display, this may be done by firstly de-interlacing the input data array, and then rotating and/or flipping the de-interlaced data array. However, this will mean that the rotation and/or flip operation (and any other operations performed after the de-interlacing operation) must be performed using the relatively large de-interlaced data array, thereby consuming bandwidth and power of the data processing system.

In an embodiment of the technology described herein, where it is desired to rotate (e.g. by 90°, 180° or 270°) and/or flip (e.g. horizontally and/or vertically) the input data array (prior to providing the data array to a display for display), this is done prior to the scaling operation, i.e. prior to the scaler scaling the data array so as to produce a de-interlaced and scaled output version of the data array. Accordingly, in an embodiment, a particular data array is rotated and/or flipped, and the input data array that is provided to the scaler for scaling is a rotated and/or flipped version of the particular data array.

This arrangement means that the rotation operation (and any other operations performed before the de-interlacing operation) may be performed on the relatively small (interlaced) input data array, thereby reducing the bandwidth and power consumption of the data processing system. Furthermore, the rotation and/or flipping operation may be (and in an embodiment is) carried out when reading the data array from memory (i.e. concurrently with the reading operation), and the rotated and/or flipped data array may then be provided to the scaler, which may be downstream of the rotation and/or flipping stage in the processing unit (processor) in question (e.g. in the display controller), i.e. internally to the processing unit.

However, this also means that the scaling operation will be (and in an embodiment is) performed on a rotated and/or flipped version of the input data array to be de-interlaced.

Where, as described above, the data array is to be de-interlaced by scaling the input data array in one direction (dimension), i.e. in either the horizontal or vertical direction, the direction of scaling may be different to the direction of scaling that would otherwise be required for scaling a non-rotated (and/or non-flipped) input data array.

Accordingly, the scaler is in an embodiment capable of scaling a data array in both directions (horizontally and vertically).

Moreover, as discussed above, in order to facilitate appropriate de-interlacing using a scaler, the one or more scaling parameters (e.g. the initial (phase) offset and/or the delta (phase) value) are in an embodiment configurable (programmable), e.g. as described above (so as to address problems with flickering, etc.). Accordingly, in an embodiment, the scaler is programmable in respect of one or more scaling parameters (e.g. and in an embodiment, the initial (phase) offset and/or the delta (phase) value) in both directions (horizontally and vertically). In particular, the scaler is in an embodiment programmable in respect of the initial (phase) offset in both directions (horizontally and vertically).

Furthermore, as described above, the initial (phase) offset defines the distance (e.g. in units of phase) from one end of the input set (row or column) of data positions to (the centre of) the first output data position of the set of output data positions. The Applicants have recognised that where, as described above, the data array is to be de-interlaced by scaling the input data array in one direction (dimension), i.e. in either the horizontal or vertical direction, the appropriate end (side) of a particular data array that is to be rotated and/or flipped from which the initial (phase) offset should be defined may be different to the end (side) that would otherwise be required, e.g. for a data array that is not to be rotated and/or flipped or that is to be rotated and/or flipped differently.

Thus, in an embodiment, the scaler is configured such that the initial (phase) offset can be defined with respect to plural different ends (sides) of the data array (i.e. the particular data array that is to be rotated and/or flipped), in an embodiment any one of plural different ends (sides) of the data array (i.e. the particular data array that is to be rotated and/or flipped). Thus, for example, the initial (phase) offset can in an embodiment be defined with respect to two or more or each of the top, the bottom, the left and the right side of the data array that is to be rotated and/or flipped, e.g. and in an embodiment depending on how the data array is to be rotated and/or flipped.

Accordingly, the initial (phase) offset may in an embodiment be defined as the distance (e.g. in units of phase) from the top, the bottom, the left and/or the right side of the particular data array that is to be rotated and/or flipped to (the centre of) the first output data position of the set of output data positions.

This then allows the scaler to be able to perform appropriate de-interlacing of rotated (and/or flipped) and non-rotated (and/or non-flipped) input data arrays (e.g. even or odd frames) using the scaler, thereby facilitating more efficient operation of the data processing system when it is desired to both de-interlace and rotate and/or flip a data array for display.

It is believed that the idea of performing the rotation and/or flipping operation prior to the scaling operation where it is desired to both de-interlace and rotate and/or flip an input data array for display is new and advantageous in its own right.

Thus, a third embodiment of the technology described herein comprises a method of operating a data processing system that includes rotation processing circuitry operable to rotate and/or flip a received input data array to provide a rotated and/or flipped output version of the input data array, and a scaler operable to scale a received input data array to provide a scaled output version of the input data array, the method comprising:

the rotation processing circuitry rotating and/or flipping an input data array so as to produce a rotated and/or flipped version of the input data array;

providing the rotated and/or flipped version of the input data array to the scaler; and the scaler scaling the rotated and/or flipped version of the input data array so as to produce a de-interlaced and rotated and/or flipped output version of the input data array.

A fourth embodiment of the technology described herein comprises a data processing system, the data processing system comprising:

rotation processing circuitry operable to rotate and/or flip a received input data array to provide a rotated and/or flipped output version of the input data array; and a scaler operable to scale a received input data array to provide a scaled output version of the input data array;

wherein the rotation processing circuitry is configured to rotate and/or flip an input data array so as to produce a rotated and/or flipped version of the input data array;

wherein the data processing system is configured to provide the rotated and/or flipped version of the input data array to the scaler; and wherein the scaler is configured to scale the rotated and/or flipped version of the input data array so as to produce a de-interlaced and rotated and/or flipped output version of the input data array.

As will be appreciated by those skilled in the art, these embodiments of the technology described herein can and in an embodiment do include one or more, and in an embodiment all, of the optional features of the technology described herein.

Thus, for example, the rotation processing circuitry may be configured to rotate the input data array by 90°, 180° or 270° and/or to flip the input data array horizontally and/or vertically.

The scaler is in an embodiment configured to be able to scale a data array in both directions (horizontally and vertically), e.g. and in an embodiment as described above.

The scaler is in an embodiment programmable in respect of one or more scaling parameters (e.g. and in an embodiment, the initial (phase) offset and/or the delta (phase) value) in both directions (horizontally and vertically), e.g. and in an embodiment as described above. In particular, the scaler is in an embodiment programmable in respect of the initial (phase) offset in both directions (horizontally and vertically), e.g. and in an embodiment as described above.

The scaler is in an embodiment configured such that the initial (phase) offset can be defined with respect to any one of plural different ends (sides) of the input data array that is to be rotated and/or flipped (i.e. of the original input data array), e.g. and in an embodiment as described above.

The scaler may be configured to scale the rotated and/or flipped version of the input data array so as to produce a de-interlaced, scaled and rotated and/or flipped output version of the input data array, e.g. and in an embodiment as described above.

The scaler and the rotation processing circuitry are in an embodiment part of a given processing unit (processor) of the data processing system, in an embodiment of a display controller. The rotated and/or flipped version of the input data array is in an embodiment provided to the scaler internally to the given processing (processor) unit, e.g. internally to the display controller (i.e. without the processing unit (processor) writing out any intermediate data to memory).

In the various embodiments described herein, the output data array can be used as desired. It may be provided for further processing in the data processing system, e.g. for further processing by one or more processors of the data processing system. However, in an embodiment, the output data array is provided to a display for display. This may particularly be the case where the scaling operation is being performed in a display controller of the data processing system.

As well as or instead of being output for display, the output data array can otherwise be provided (output) for use as desired. Thus it may, for example, be written out to memory from where it may then be used for further processing. Thus, in an embodiment, the output data array is written to memory of the data processing system (e.g. as well as, or instead of, being displayed).

While it would be possible for the output data array to form the entire output data array, e.g. image, that is output (e.g. displayed) (and in one embodiment this is the case), there could be situations where it is desired to combine the output data array with further data arrays to provide an overall output data array. This could be the case, for example, where the output data array is to be composited with other data arrays (surfaces), e.g. for display. Thus, in an embodiment, the technology described herein further comprises combining the output data array with one or more further data arrays to provide an overall output data array. In these arrangements, the output data array can be combined with a further data array or arrays in any suitable and desired manner, e.g. according to the desired data array composition process. The further data arrays may themselves be de-interlaced and/or scaled and/or rotated and/or flipped in the manner of the technology described herein, if and as desired (or may be not de-interlaced, scaled, rotated and/or flipped at all).

The various stages of the data processing system may be implemented as desired, e.g. in the form of one or more fixed function units (hardware) (i.e. that is dedicated to one or more functions that cannot be changed), and/or as one or more programmable processing stages, e.g. by means of programmable circuitry that can be programmed to perform the desired operation. There may be both fixed function and programmable stages.

One or more of the various stages may be provided as separate circuit elements to one another. Additionally or alternatively, some or all of the stages may be at least partially formed of (provided by) shared circuitry.

It would also be possible for the display controller to comprise, e.g., two (or more) display processing cores, each configured in the manner discussed above, if desired.

As well as including the necessary scaler, processing circuitry, etc., in order to be able to operate in the manner of the technology described herein, the data processing system of the technology described herein can otherwise include any one or more or other components that such data processing systems can and/or normally comprise.

Thus, the data processing system may and in an embodiment does also comprise one or more of, and in an embodiment all of: a central processing unit, a graphics processing unit, a video processor (codec), a display controller, a system bus, and a memory controller.

The data processing system (and/or display controller) may be, and in an embodiment is, configured to communicate with one or more of (and the technology described herein also extends to an arrangement comprising one or more of): an external memory (e.g. via a memory controller), one or more local displays, and/or one or more external displays. The external memory in an embodiment comprises a main memory (e.g. that is shared with the central processing unit (CPU)) of the overall data processing system.

The display may be any suitable and desired display, such as for example, a screen. It may comprise the overall data processing system's (device's) local display (screen) and/or an external display. There may be more than one display output, if desired.

Thus, in some embodiments, the display controller and/or data processing system comprises, and/or is in communication with, one or more memories and/or memory devices that store the data described herein, and/or store software for performing the processes described herein. The display controller and/or data processing system may also be in communication with and/or comprise a host microprocessor, and/or with and/or comprise a display for displaying images based on the data generated by the display controller.

Correspondingly, a further embodiment of the technology described herein comprises a data processing system comprising:
a main memory;
a display;
one or more processing units operable to generate input surfaces for display and to store the input surfaces in the main memory;
a display controller, the display controller comprising a scaler operable to scale a received input data array to provide a scaled output version of the input data array; and
processing circuitry configured to provide an input data array to be de-interlaced to the scaler;
wherein the scaler is configured to scale the input data array so as to produce a de-interlaced and scaled output version of the input data array.

A further embodiment of the technology described herein comprises a data processing system comprising:
a main memory;
a display;
one or more processing units operable to generate input surfaces for display and to store the input surfaces in the main memory; and
a display controller, the display controller comprising rotation processing circuitry operable to rotate and/or flip a received input data array to provide a rotated and/or flipped output version of the input data array and a scaler operable to scale a received input data array to provide a scaled output version of the input data array;
wherein the rotation processing circuitry is configured to rotate and/or flip an input data array so as to produce a rotated and/or flipped version of the input data array;
wherein the data processing system is configured to provide the rotated and/or flipped version of the input data array to the scaler; and
wherein the scaler is configured to scale the rotated and/or flipped version of the input data array so as to produce a de-interlaced and rotated and/or flipped output version of the input data array.

As will be appreciated by those skilled in the art, these embodiments of the technology described herein can and in an embodiment do include one or more, and in an embodiment all, of the optional features of the technology described herein.

The operation in the manner of the technology described herein is in an embodiment repeated for plural output data arrays to be generated, e.g., and in an embodiment, for a sequence of frames to be displayed.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the data processing system, such as the display controller, can otherwise include any one or more or all of the usual functional units, etc., that such components include.

It will also be appreciated by those skilled in the art that all of the described embodiments of the technology described herein can, and in an embodiment do, include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web. An embodiment of the technology described herein will now be described with reference to the Figures.

FIG. 1 shows schematically a data processing system in accordance with an embodiment of the present embodiment. The data processing system comprises a central processing unit (CPU) 1, graphics processing unit (GPU) 2, video codec 3, display controller 4 and a memory controller 5. As shown in FIG. 1, these communicate via an interconnect 6 and have access to off-chip main memory 7. The CPU 1, and/or the GPU 2, and/or the video codec 3 generate output surfaces (data arrays) and store them, via the memory controller 5, in a frame buffer in the off-chip memory 7. The display controller 4 then reads output surfaces from the frame buffer in the off-chip memory 7 via the memory controller 6 and sends them to a display 8 for display.

Figure 2:
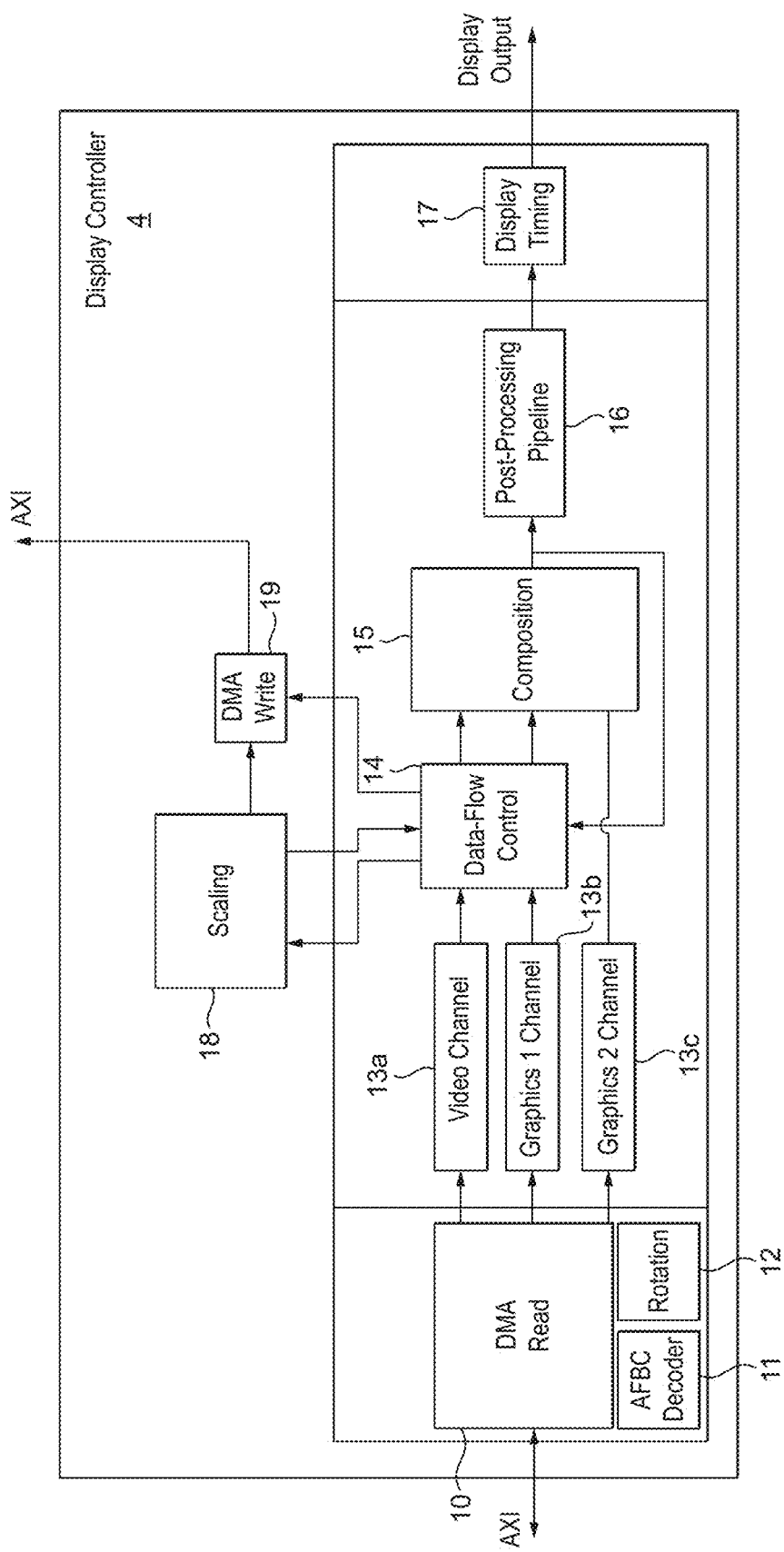
FIG. 2 shows schematically a display controller in accordance with an embodiment of the technology described herein.

FIG. 2 shows schematically a display controller 4 in accordance with an embodiment of the technology described herein. In FIG. 2, the rectangles represent functional units of the display controller, while the arrowed lines represent connections between the various functional units.

FIG. 2 shows the main elements of the display controller 4 that are relevant to the operation of the present embodiment. As will be appreciated by those skilled in the art there will be other elements of the display controller 4 that are not illustrated in FIG. 2. It should also be noted here that FIG.

2 is only schematic, and that, for example, in practice the shown functional units and stages may share significant hardware circuits, even though they are shown schematically as separate stages in FIG. 2. It will also be appreciated that each of the stages, elements and units, etc., of the display controller 4 as shown in FIG. 2 may be implemented as desired and will accordingly comprise, e.g., appropriate circuitry and/or processing logic, etc., for performing the necessary operation and functions.

In the present embodiment, the display controller 4 comprises a read controller in the form of a Direct Memory Access (DMA) read controller 10. The read controller 10 is configured to read one or more surfaces from main memory 7 (not shown in FIG. 2) via an interface such as an Advance eXtensible Interface (AXI). The one or more surfaces will typically be in the form of (optionally compressed) RGB data.

Optionally co-located with the read controller 10 is a decoder 11 which, where present, can be used to (selectively) decode (decompress) received compressed surfaces as necessary, before onward transmission of the one or more decoded (decompressed) surfaces. The decoder 11 may comprise an ARM Frame Buffer Compression (AFBC) decoder (AFBC is described in US A1 2013/0034309).

Similarly, rotation processing circuitry 12 can be used to selectively rotate one or more of the input surfaces as necessary before onward transmission of the one or more input surfaces.

In the illustrated embodiment, the read controller 4 is configured to (read) up to three different input surfaces (layers) which are to be used to generate a composited output frame. In this embodiment, the three input layers comprise one video layer, e.g. generated by a video processor (codec), and two graphics layers, e.g. two graphics windows generated by a graphics processing unit (GPU). Hence, FIG. 2 shows the displayer controller onwardly transmitting three input surfaces (display layers) via three layer pipelines or channels, namely video channel 13a, a first graphics channel 13b, and a second graphics channel 13c. Any or all of the transmitted input surfaces may have been subjected to decoding (decompression) by decoder 11 and/or rotation by rotation unit 12, as discussed above.

Although the embodiment of FIG. 2 illustrates the use of three input surfaces, it will be appreciated that any number of input surfaces (layers) may be used in the technology described herein, depending on the application in question (and also depending on any silicon area constraints, etc.). Equally, any number of layer pipelines or channels may be provided and used, as desired.

The display controller 4 of the present embodiment optionally comprises a multiplexer/data-flow control 14. Where present, the display controller may be configured such that multiplexer 14 receives inputs from any one or more (or all) of the input surface channels. The multiplexer 14 may operate to selectively transmit any one or more (or all) of the received inputs (i.e. surfaces) to any one or more of the multiplexer's 14 outputs.

The display controller 4 of the present embodiment optionally comprises a composition unit 15. Where present, the display controller 4 may be configured such that the composition unit 15 receives inputs directly from any one or more or all of the channels 13, and/or from the multiplexer 14. The composition unit 15 may operate to compose the received input surfaces to generate a composited output frame, i.e. by appropriate blending operations, etc. In the illustrated embodiment, the composited output frame may be onwardly transmitted by the composition unit 15 to multiplexer 14, and/or to post-processing pipeline 16.

The post-processing pipeline 16 is configured to selectively carry out any desired processing operation(s) on the (optionally composited) output surface (frame). The post-processing pipeline 16 may, for example, comprise a colour conversion stage operable to apply a colour conversion to the (optionally composited) output frame, a dithering stage operable to apply dithering to the (optionally composited) output frame, and/or a gamma correction stage operable to carry out gamma correction on the (optionally composited) output frame.

In the present embodiment, the post-processing pipeline 16 is configured to transmit the (processed) output frame to an output stage comprising a display timing unit 17 for appropriate display on a (local) display 8 (not shown in FIG. 2). The display timing unit 17 is configured to send pixel data to the display with appropriate horizontal and vertical blanking periods.

The display controller 4 of the present embodiment comprises a scaling engine 18. The scaling engine 18 operates to (selectively) scale (i.e. upscale or downscale) any one or more received surfaces (frames) to generate a scaled surface (frame). The operation of the scaler 18 will be described in more detail below.

In the present embodiment, the display controller optionally comprises a write controller 19, e.g. in the form of a DMA write controller. Where present, the write controller 19 may be configured to write out received surfaces (frames) to external memory 8 (e.g. frame buffer), e.g. via AXI.

Thus, this embodiment of the technology described herein comprises a display controller that integrates a rotation unit 12 and a scaler 18, optionally together with a composition unit 15. The rotation unit 12 and the scaler 18 are embedded within the display controller, such that surfaces read by the display controller 4 may be rotated and/or scaled (and then optionally further processed, e.g. composited) before being displayed, with only a single read (of each input surface) from the frame buffer being required.

Figure 3:
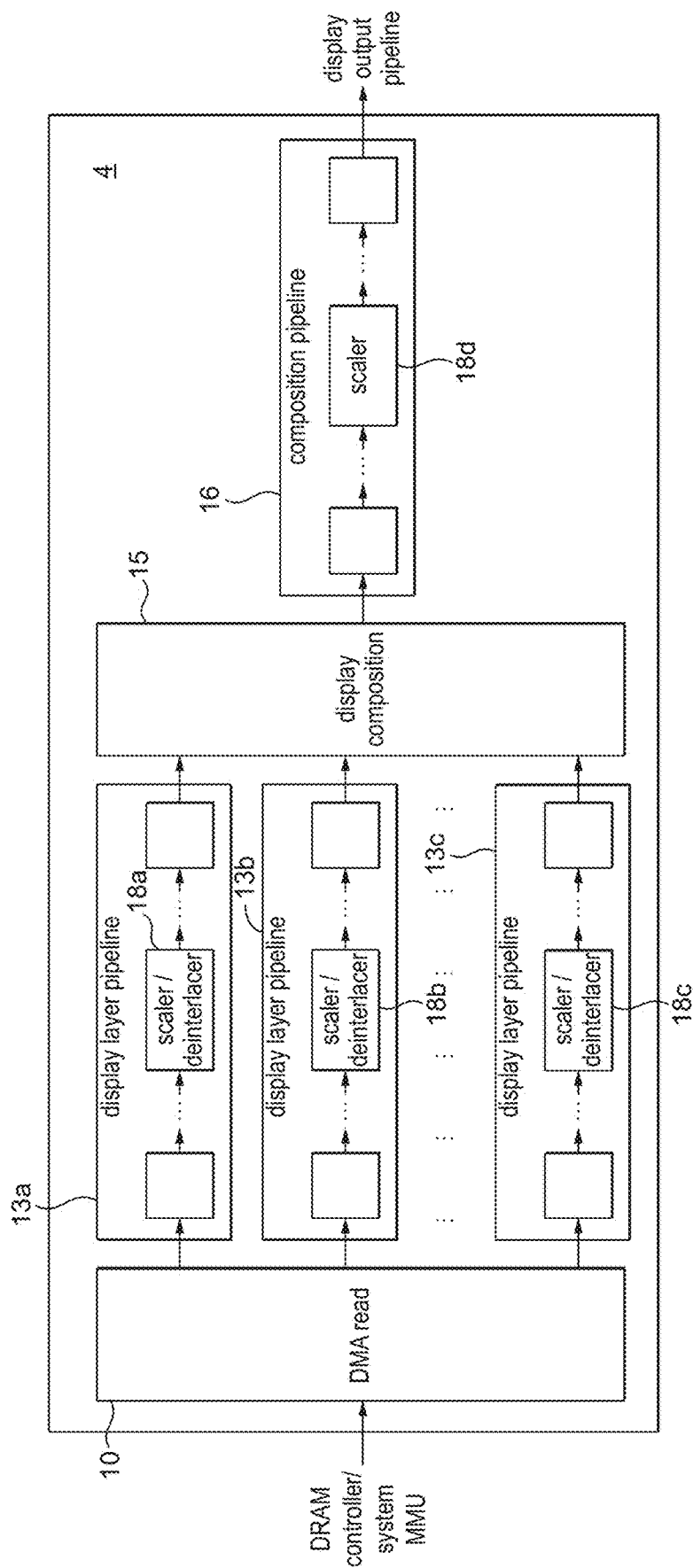
FIG. 3 shows schematically a display controller in accordance with an embodiment of the technology described herein.

FIG. 3 shows schematically a display controller 4 in accordance with an alternative embodiment of the technology described herein. The display controller 4 of FIG. 3 is similar to the display controller 4 of FIG. 2, except that multiple scalers 18 are provided in the display controller. In particular, a scaler 18a-18c is provided in each of the layer pipelines 13a-13c. A scaler 18d may also be provided in the post-processing pipeline 16.

Figure 4:
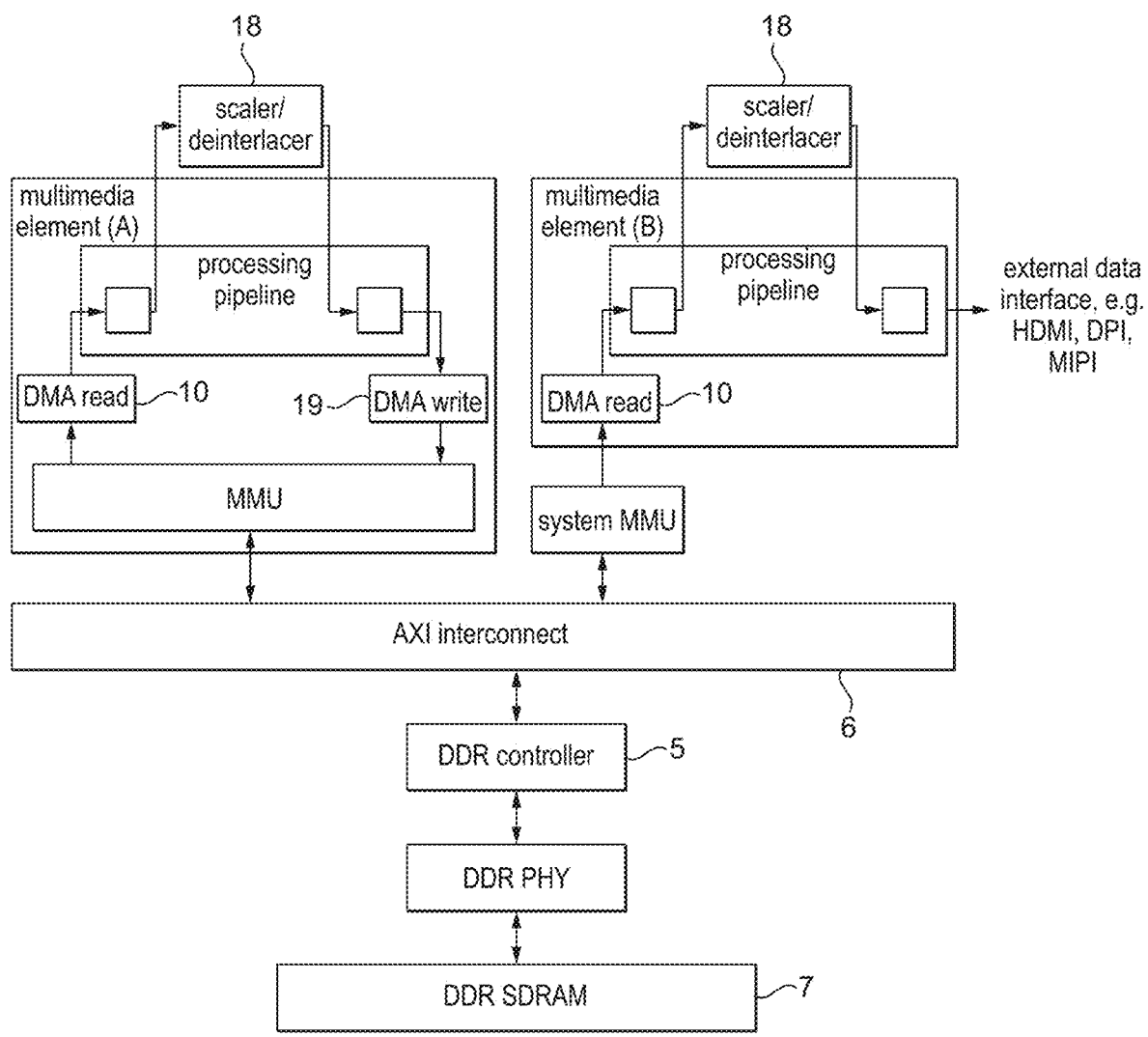
FIG. 4 shows schematically a data processing system in accordance with an embodiment of the technology described herein.

More generally, one or more scalers 18 may be provided in any one or more or each of the data processing units 1, 2, 3, 4 of the data processing system of FIG. 1. This is illustrated schematically by FIG. 4, where scalers 18 are provided in each of the processing pipelines of two separate data processing units (which may be e.g. a central processing unit (CPU) 1, a graphics processing unit (GPU) 2, a video codec 3, or a display controller 4) of the data processing system.

In the present embodiment, interlaced video data, comprising a sequence of interleaved even and odd (video) frames (fields), is generated by the video codec 3 (video processor). The interlaced video data could also be generated by the GPU 2, or by a digital camera image signal processor (ISP), or other image processor. Each of the even and an odd video frames (fields) may be stored in a respective frame buffer in memory 7.

Figure 5:
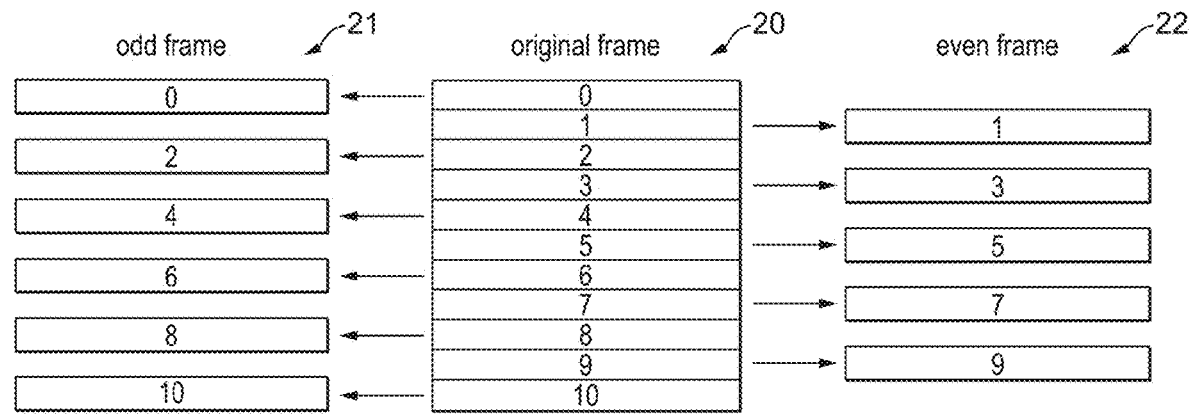
FIGS. 5 and 6 illustrate schematically the interlacing technique in accordance with embodiments of the technology described herein.

As illustrated by FIG. 5, each video frame 20 (e.g. decoded by the video codec 3, generated by the GPU 3 or generated by an ISP) is effectively split into two separate interlaced video frames (or "fields"), namely an odd frame (field) 21 and an even frame (field) 22. Each even frame 22 comprises each of the even lines of the corresponding original video frame 20, and each odd frame 21 comprises each of the odd lines of the corresponding original video frame 20.

Figure 6:
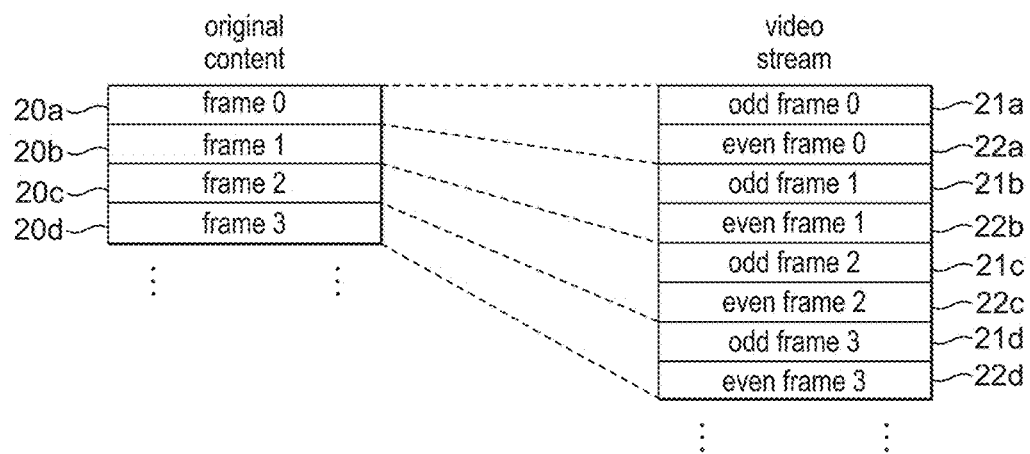

Each video frame is propagated through the data processing system in the form of these two (even and odd) frames. This is illustrated by FIG. 6. A stream of original video frames 20a-20d is effectively converted into a stream of corresponding interleaved odd 21a-21d and even 22a-22d frames.

When it is desired to display the video content, each of the odd 21 and even 22 frames must be separately de-interlaced, and then provided to the display 8 for display. This has the effect of doubling the frame rate, without using additional bandwidth, relative to the rate at which the VPU 3 generates frames.

In the present embodiment, odd 21 and even 22 frames for display are also scaled (upscaled or downscaled) before being provided to the display 8 for display.

This is done, in accordance with the technology described herein, by simultaneously de-interlacing and scaling the interlaced video data for display using the scaler 18 of the display controller 4.

In the present embodiment, the scaler 18 is configured to scale (upscale or downscale) a received input frame to provide a scaled output version of the input frame using polyphase filtering. It would, of course, be possible to use other scaling techniques.

Each input frame 21, 22 to be scaled will comprise an array of data positions, with each data position taking a particular data value. Accordingly, each frame comprises plural columns of data positions and plural row or lines of data positions. In the present embodiment, the input frame is an image for display, and so each data value of the array comprises a colour value. However, it would be possible for each data value to represent some other parameter.

In the present embodiment, the scaler 18 is operable to scale each input frame in the vertical direction by separately scaling each column of data positions. That is, for each column of N data positions of the frame, a scaled version of that column of N data positions is generated, which will comprise some other number M of data positions.

Figure 7:
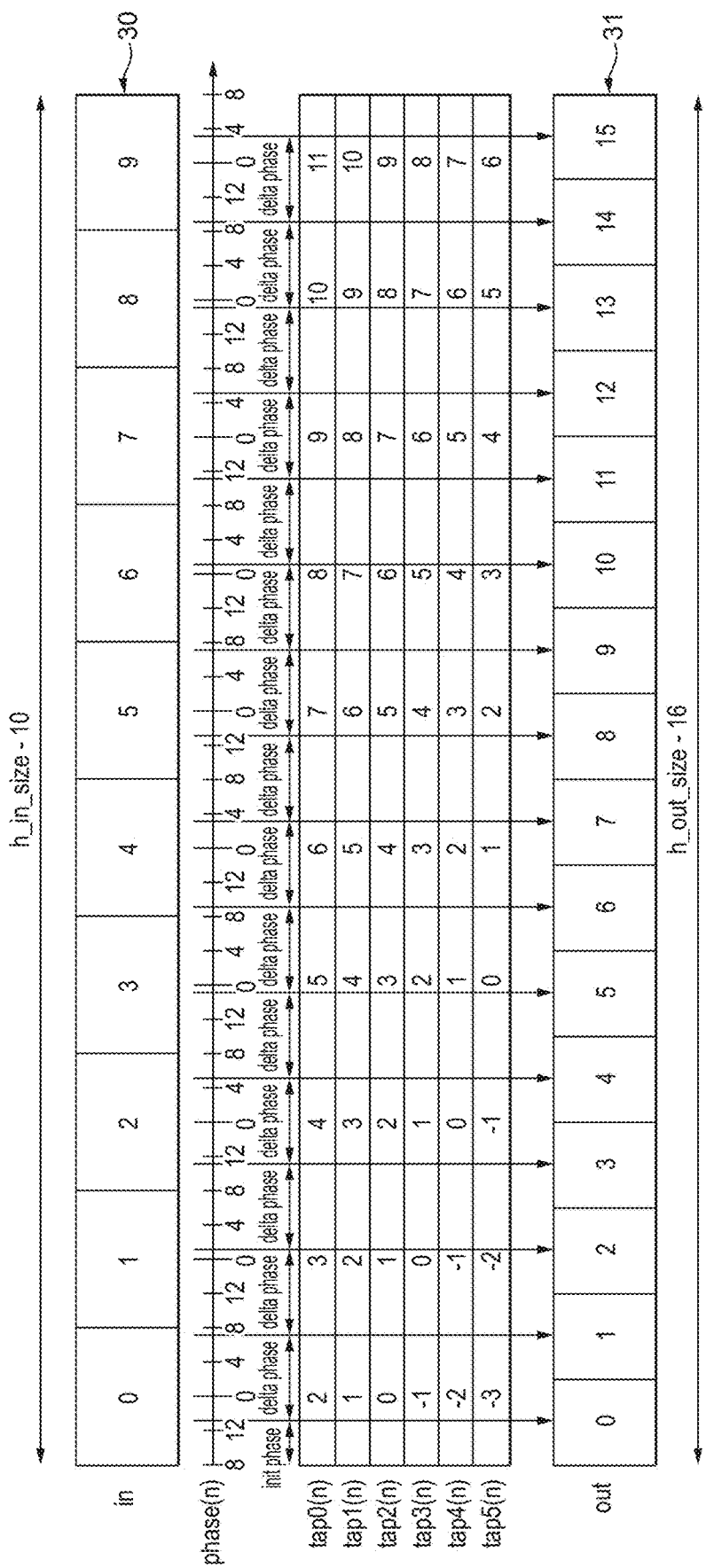
FIG. 7 shows schematically the process of upscaling a data array using polyphase filtering.
Figure 8:
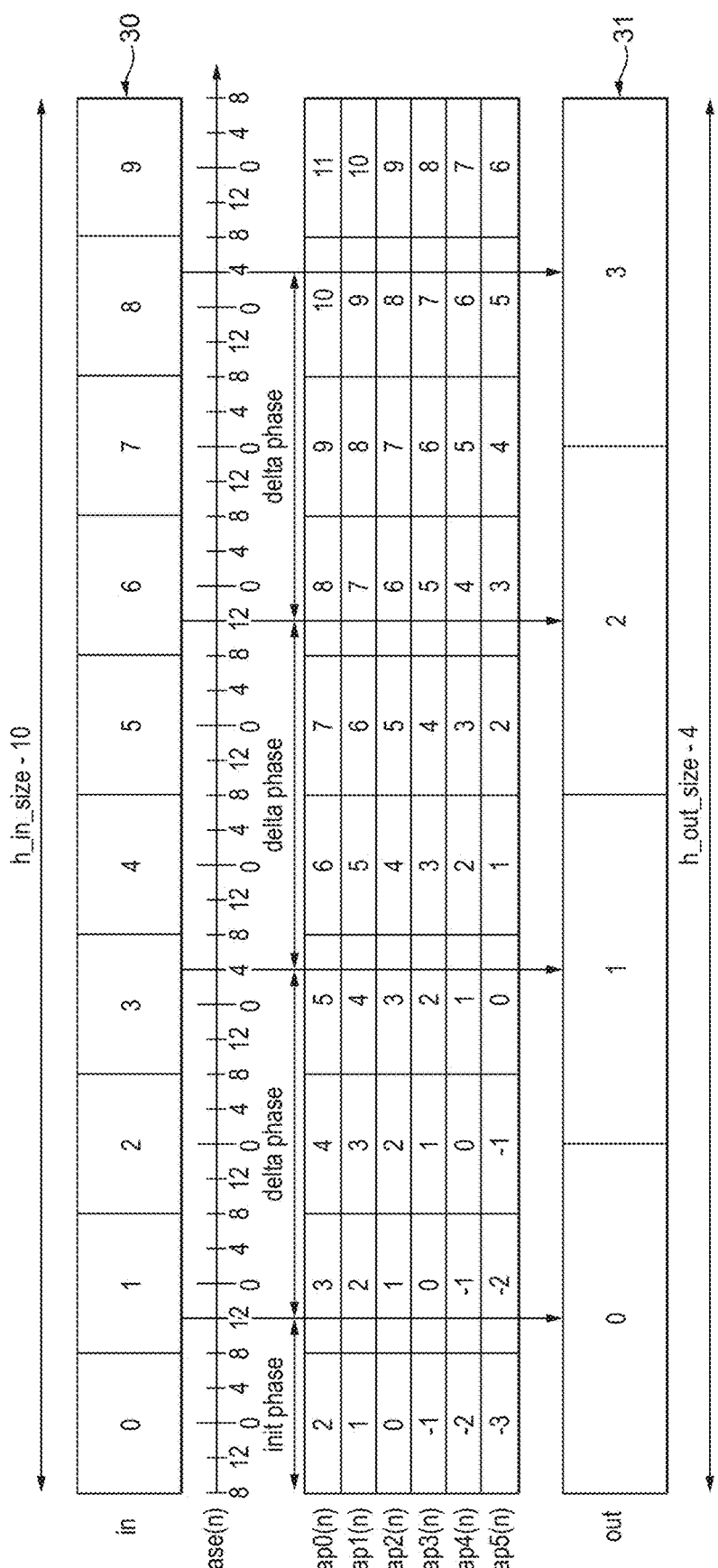
FIG. 8 shows schematically the process of downscaling a data array using polyphase filtering.

As shown in FIGS. 7 and 8, an output column 31 of M data positions is generated from an input column 30 of N data positions. FIG. 7 illustrates an example of upscaling (where M>N), and FIG. 8 illustrates an example of downscaling (where M<V). In particular, FIG. 7 illustrates upscaling from 10 to 16 pixels, whereas FIG. 8 illustrates downscaling from 10 to 4 pixels.

The scaler 18 is configured to use some fixed number of filter taps and some fixed number of phases. In particular, FIGS. 5 and 6 illustrated examples of scaling using a 6-tap, 16-phase polyphase filter. However the techniques described herein can be straightforwardly extended to any number of filter taps and phases.

The number of filter taps defines how many of the input data values are used to generate each output data value. For each output data position, the data values of the nearest input data positions are used in generating the output data value. This is illustrated by FIGS. 7 and 8, where the data values of the data positions indicated by each of the numbers that each vertical arrow crosses are used to generate each output data value. Where data positions falling outside of the range of input data positions are indicated, the data value of the nearest data position may be used instead.

These data values are combined using a weighting that is selected depending on a phase value of each output data position.

A phase value is defined for each output data position, with the phase defining how aligned the output data position in question is with the set of input data positions 30. As shown in FIGS. 7 and 8, the phase scale is defined in relation to the positions of the set of input data positions 30. The phase is zero at the centre of each of the input data positions, and varies linearly up to the maximum phase value between adjacent input data positions.

Thus, an output data position would have a phase value of zero where it is aligned with one of the plural input data positions. Output data positions that are not aligned with an input data position will have some non-zero value of phase.

By using the phase value to select the weighting (set of coefficients) that is used to combine the data values of plural input data positions to produce the data value for an output data position, the scaler 18 can produce an improved output, e.g. with reduced aliasing artefacts and the like.

In the present embodiment, since both the column of input data positions 30 and the column of output data positions 31 has a regular periodic form, then the set of phase values for a given column of output data positions can be characterised by two scaling parameters, namely an initial phase offset together with a delta phase value.

As shown in FIGS. 7 and 8, the initial phase offset defines the distance, in units of phase, from one end of the input column of data positions 30 to the centre of the first output data position. The delta phase defines the distance, in units of phase, between the centres of adjacent output data positions.

The scaler 18 is programmable in respect of the initial phase offset and the delta phase, and the scaling operation can be controlled by appropriately programming the scaler 18 in respect of these scaling parameters.

Figure 9:
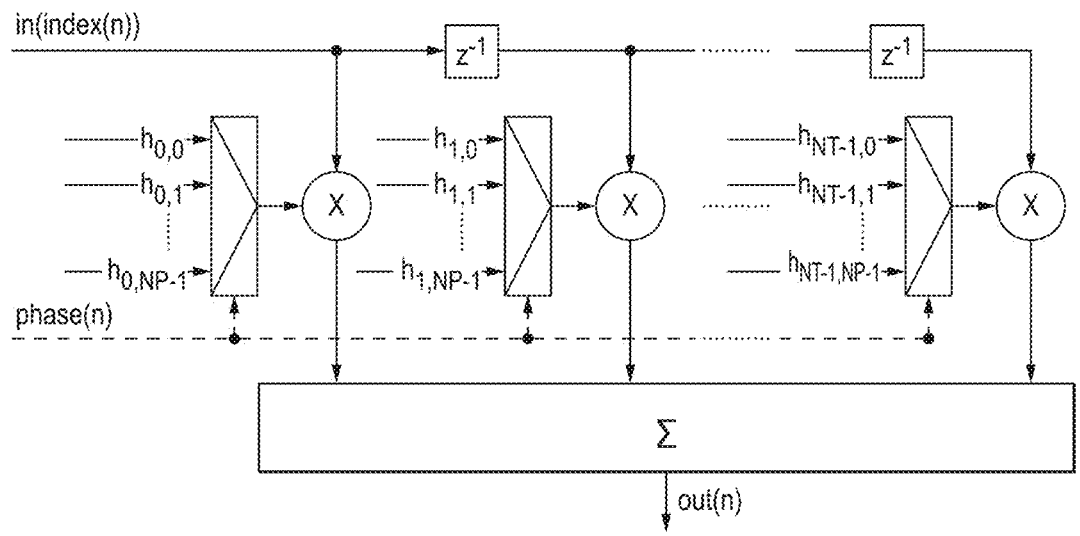
FIG. 9 shows schematically the polyphase filtering technique that may be used in embodiments of the technology described herein.

FIG. 9 illustrates polyphase filtering, where the symbol $h_{m,n}$ denotes the coefficient for the mth tap and nth phase.

Polyphase filtering makes use of fast impulse response (FIR) filters with impulse responses divided into phases. The technique allows filtering with an accuracy equal to NP/2 of an input sample (where NP is the number of filter phases), and can give high quality results even with a small number of filter taps.

In order to compute each output sample, the phase of the scaling filter corresponding to the output sample must be computed (to select a proper set of scaling coefficients), together with the indexes of input samples required to perform the filtering. These parameters are computed according to Equations 1 and 2 below:

$$\text{index}(n) = \text{floor}\left(\frac{\text{initial\_phase} + n \cdot \text{delta\_phase}}{NP} + 0.5\right) - 1, \quad (1)$$

$$\text{phase}(n) = \text{floor}\left(\text{mod}\left(\text{initial\_phase} + n \cdot \text{delta\_phase} + \frac{NP}{2}, NP\right)\right), \quad (2)$$

$$\text{delta\_phase} = \frac{\text{size\_in}}{\text{size\_out}} \cdot NP, \quad (3)$$

where n is the index of the output sample, index(n) is the index of the "middle" input sample, phase(n) is the filter phase for output sample n, initial_phase is the initial phase offset, delta_phase is the phase increase corresponding to one output sample (as defined by Equation 3), size_in is the input size of the scaled image, size_out is the output size of the scaled image, NP is the number of filter phases, floor(a) indicates that a should be rounded down to the nearest integer (i.e. towards minus infinity), and mod(a, b) indicates the modulus after division of a by b.

In order to compute one output sample, NT input samples are needed (where NT represents the number of filter taps). Equation 1 calculates the index of a sample from a "middle" tap of the scaling filter. The middle tap is tap floor(NT/2) of the filter, where floor(a) denotes rounding of a to the nearest integer towards minus infinity. This means that the following input samples are filtered during computation of the nth output sample:

$$\text{index}(n) + \frac{NT}{2}, \text{index}(n) + \frac{NT}{2} - 1, \ldots, \text{index}(n) - \frac{NT}{2} + 1,$$

if $NT$ is an even number, and $$\text{index}(n) + \frac{NT-1}{2}, \text{index}(n) + \frac{NT-1}{2} - 1, \ldots, \text{index}(n) - \frac{NT-1}{2},$$

if $NT$ is an odd number.

The value of the initial phase offset determines the phase value used to be used to compute the first output pixel.

Although the present embodiment is described in terms of the scaler 18 scaling a received input frame using polyphase filtering, it would also be possible for the scaler 18 to use other types of interpolation for the scaling operation, such as nearest neighbour interpolation, bilinear interpolation, bicubic interpolation, etc.

Figure 10:
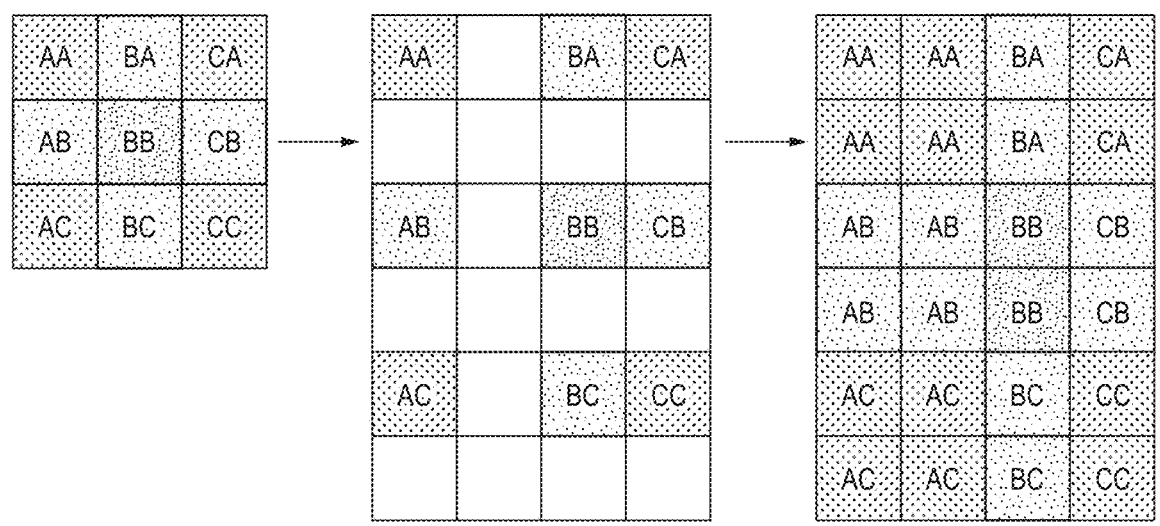
FIG. 10 shows schematically the nearest neighbour scaling technique that may be used in embodiments of the technology described herein.

FIG. 10 illustrates the nearest neighbour technique. The nearest neighbour algorithm involves replicating or removing input samples in order to produce an output data array of the desired size.

FIG. 10 illustrates an example of scaling from a 3×3 data array to a 4×6 data array using the nearest neighbour technique. As shown in FIG. 10, each of the data values AA-CC of the original input data array is replicated multiple times in the scaled output version of the input data array.

Figure 11:
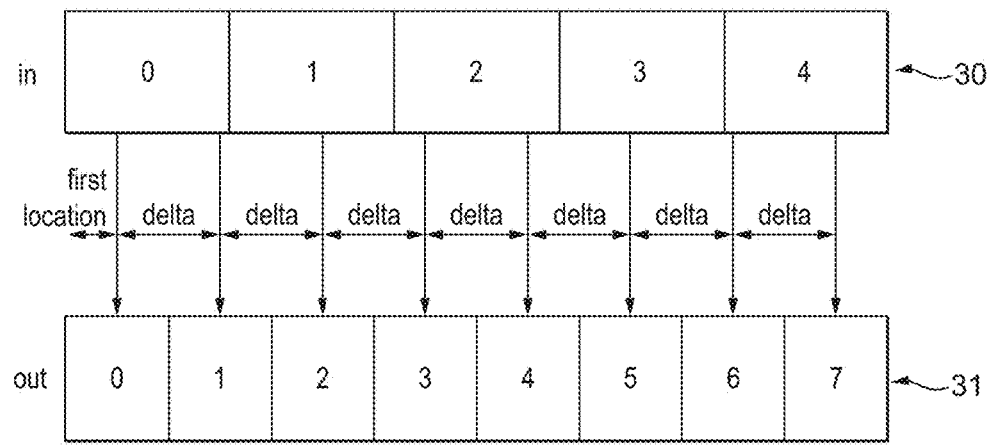
FIG. 11 shows schematically the process of upscaling a data array using nearest neighbour scaling.
Figure 12:
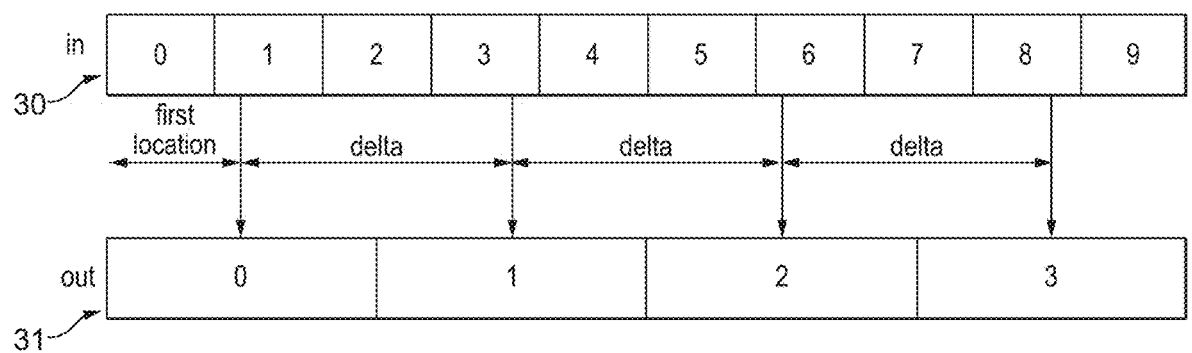
FIG. 12 shows schematically the process of downscaling a data array using nearest neighbour scaling.

FIGS. 11 and 12 illustrate the nearest neighbour technique in terms of separately scaling each column of data positions (i.e. in a corresponding manner to that described above). FIG. 11 illustrates an example of upscaling from 5 to 8 pixels, and FIG. 12 illustrates an example of downscaling from 10 to 4 pixels.

For each output data position of the output column of data positions 31, it is determined which input data position of the input column of data positions 30 should be used (replicated) to produce the data value for that output data position.

As in the polyphase method described above, this process can be characterised by two scaling parameters. The first scaling parameter determines which input data position should be used in respect of the first output data position. This parameter is equivalent to the "initial phase" of polyphase filtering described above. The second scaling parameter determines which input data positions should be used in respect of each of the other output data positions, and has the form of a distance equal to the input resolution divided by the output resolution. This distance ("delta" in FIGS. 11 and 12) is equivalent to the "delta phase" in polyphase filtering described above.

Using the naming convention of polyphase filtering, the nearest neighbour technique can be described using Equations 4 and 5 below:

$$\text{out}(n) = \text{in}\left(\text{floor}\left(\frac{\text{initia\_phase} + n \cdot \text{delta\_phase}}{NP} + 0.5\right) - 1\right), \quad (4)$$

$$\text{delta\_phase} = \frac{\text{size\_in}}{\text{size\_out}} \cdot NP, \quad (5)$$

where n is the index of output data position, out(n) is the value of the nth output data position, initial_phase is the initial phase offset, delta_phase is the phase increase corresponding to one output data position (defined by Equation 5), NP is the number of filter phases, and floor(a) denotes rounding of a to the nearest integer towards minus infinity.

Accordingly, when using nearest neighbour scaling, the "initial phase" can be understood as the distance from one side (e.g. the left side) of the input set of data positions to the place in the input set of data positions from which the data value for the first output data position is taken, the "delta phase" can be understood as the number of input data positions corresponding to one output data position, and "NP" can be understood as the precision at which the value of each output data position is selected from the input data positions.

The techniques of the technology described herein and embodiments can correspondingly be applied to other scaling techniques.

In the present embodiment, simultaneous de-interlacing and scaling in the manner of the technology described herein is achieved by appropriate programming of the scaling parameters.

It should be noted in this regard, that when performing de-interlacing, simply upscaling the input array by a factor of two would not result in an appropriately de-interlaced frame. This is because a sequence of interleaved even frames 22 (fields) comprising only the even lies of an original frame 20 and odd frames 21 (fields) comprising only the odd lies of the original frame 20 must be de-interlaced, so that simply upscaling each frame in turn would result in flickering of the displayed image, whereby the displayed image would appear to jump up and down from frame to frame. Equally, where the original frame 20 comprises an odd number of lines, the resulting even 22 and odd 21 frames (fields) will comprise different numbers of lines, and so will require different levels of scaling to produce equally sized (de-interlaced) frames for display.

However, it is possible to achieve de-interlacing by appropriately setting the initial phase and the delta phase in dependence on whether the input frame is an even frame 22 or an odd frame 21, and in dependence on whether the original frame 20 from which the even or odd frame in question is derived had an even or odd number of lines.

Figure 13:
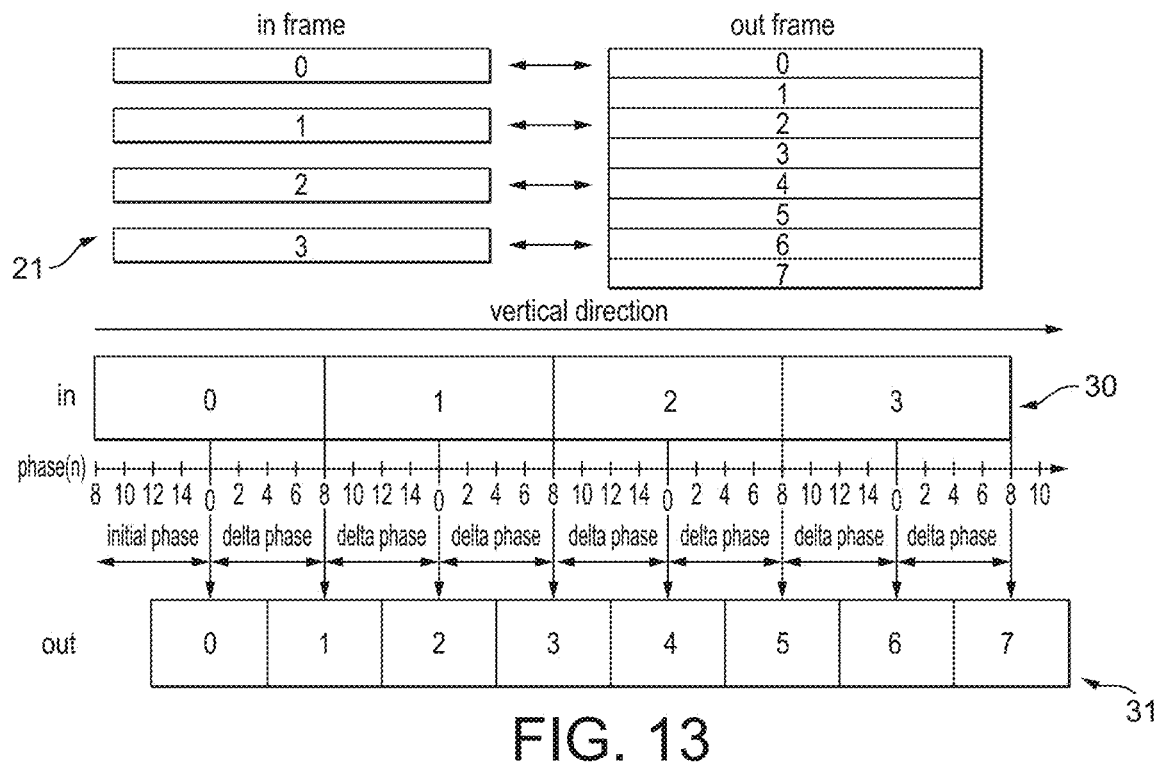
FIG. 13 shows schematically the process of de-interlacing an odd frame using polyphase filtering, where the de-interlaced output frame has an even number of lines.

As illustrated by FIG. 13, where the original frame 20 had an even number of lines, for an odd frame 21, appropriate de-interlacing can be achieved by setting the delta phase and initial phase as follows:

$$\text{delta\_phase} = \frac{1}{2} \cdot NP, \text{ and}$$

$$\text{initial\_phase} = \frac{NP}{2}.$$

Note that in this case, this is the same value as defined by Equation 3, i.e. as for normal upscaling.

Figure 14:
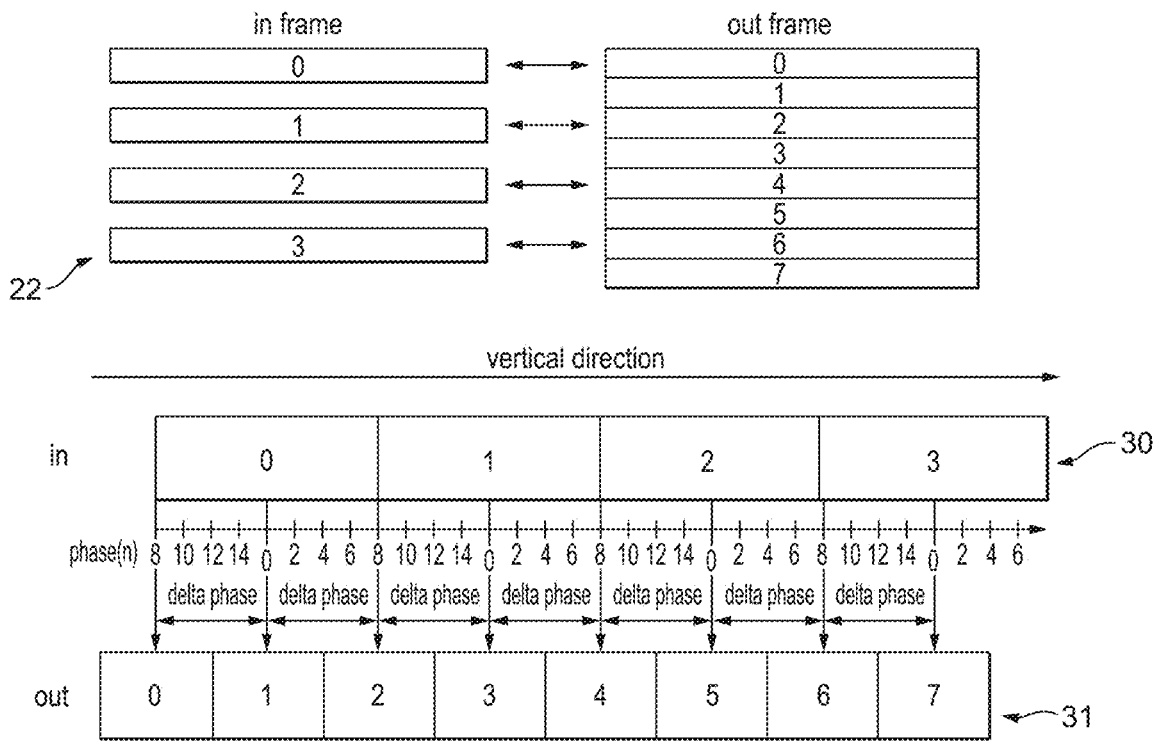
FIG. 14 shows schematically the process of de-interlacing an even frame using polyphase filtering, where the de-interlaced output frame has an even number of lines.

As illustrated by FIG. 14, where the original frame 20 had an even number of lines, for an even frame 22, appropriate de-interlacing can be achieved by setting the delta phase and initial phase as follows:

$$\text{delta\_phase} = \frac{1}{2} \cdot NP, \text{ and}$$

$$\text{initial\_phase} = 0.$$

Note that in this case, this is the same value as is defined by Equation 3, i.e. as for normal upscaling.

Figure 15:
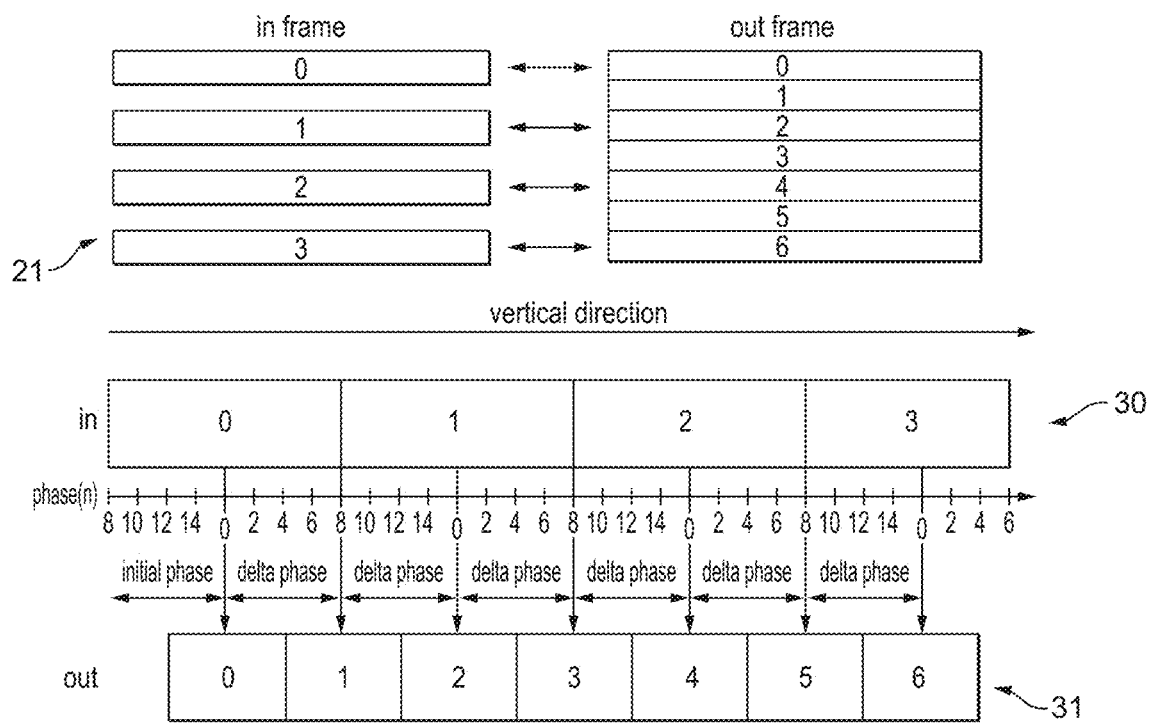
FIG. 15 shows schematically the process of de-interlacing an odd frame using polyphase filtering, where the de-interlaced output frame has an odd number of lines.

As illustrated by FIG. 15, where the original frame 20 has an odd number of lines, for an odd frame 21, appropriate de-interlacing can be achieved by setting the delta phase and initial phase as follows:

$$\text{delta\_phase} = \frac{1}{2} \cdot NP, \text{ and}$$

$$\text{initial\_phase} = \frac{NP}{2}.$$

Note that in this case, this is not the same value as defined by Equation 3 (as for normal upscaling), but the value is instead for upscaling by two times (not for upscaling from (n) to (2n−1)).

Figure 16:
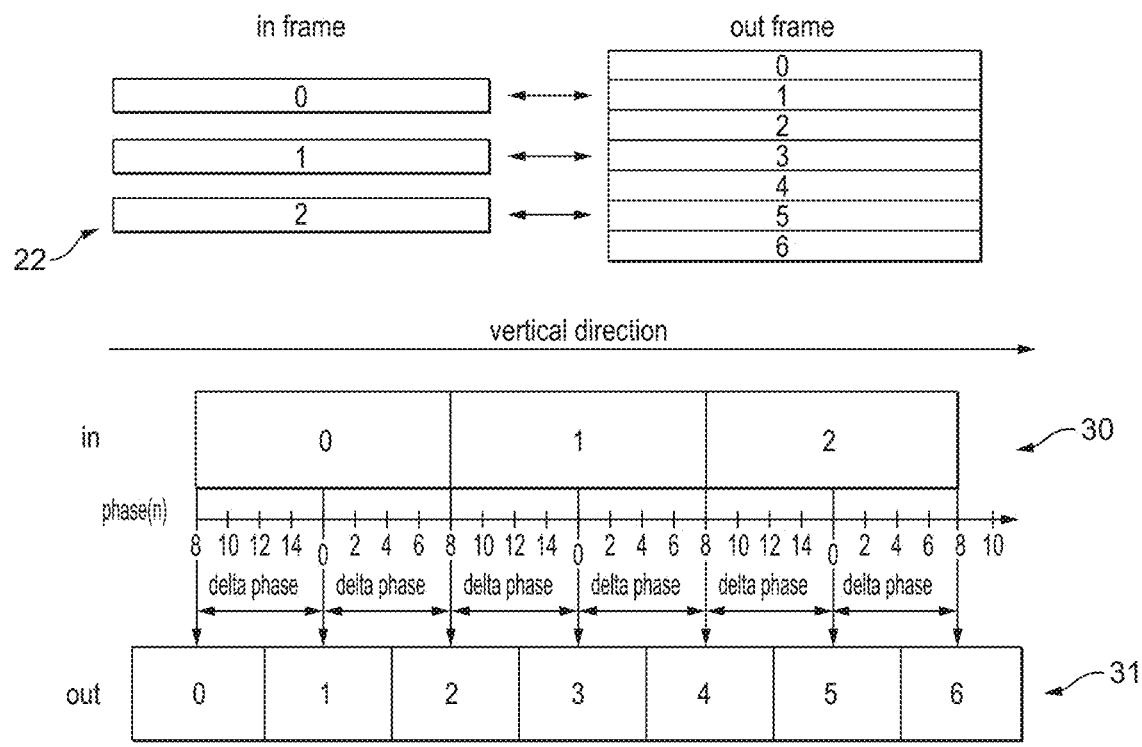
FIG. 16 shows schematically the process of de-interlacing an even frame using polyphase filtering, where the de-interlaced output frame has an odd number of lines.

As illustrated by FIG. 16, where the original frame 20 had an odd number of lines, for an even frame 22, appropriate de-interlacing can be achieved by setting the delta phase and initial phase as follows:

$$\text{delta\_phase} = \frac{1}{2} \cdot NP, \text{ and}$$

$$\text{initial\_phase} = 0.$$

Note that in this case, this is not the same value as is defined by Equation 3 (as for normal upscaling), but the value is for upscaling by two rimes (not for upscaling from (n) to (2n+1)).

In the present embodiment, the scaler is operable to perform simultaneous de-interlacing and scaling.

Figure 17:
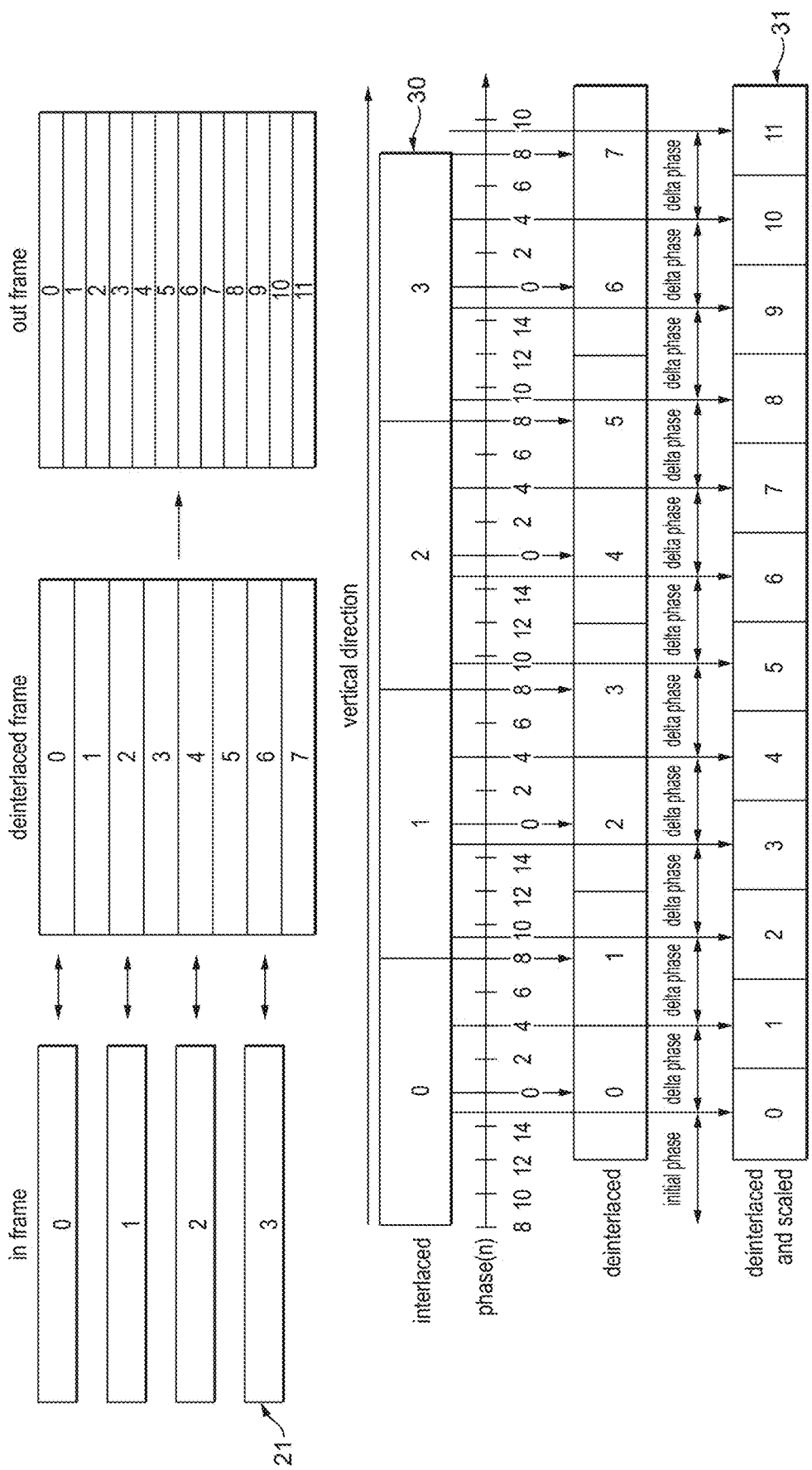
FIG. 17 shows schematically the process of simultaneous de-interlacing and scaling of an odd frame using polyphase filtering in accordance with an embodiment of the technology described herein.

As illustrated by FIG. 17, where the input frame comprises an odd frame 21 (field) to be de-interlaced and scaled, then the scaling parameters used in the scaling operation are selected to be:

$$\text{delta\_phase} = \frac{1}{2} \cdot \text{scaling\_ratio} \cdot NP, \text{ and}$$

$$\text{initial\_phase} = \frac{1}{4} \cdot NP + \frac{1}{2} \cdot \text{scaling\_ratio} \cdot NP,$$

where NP is the number of filter phases of the scaler, and scaling_ratio is the scaling ratio between the de-interlaced and the output frame.

Figure 18:
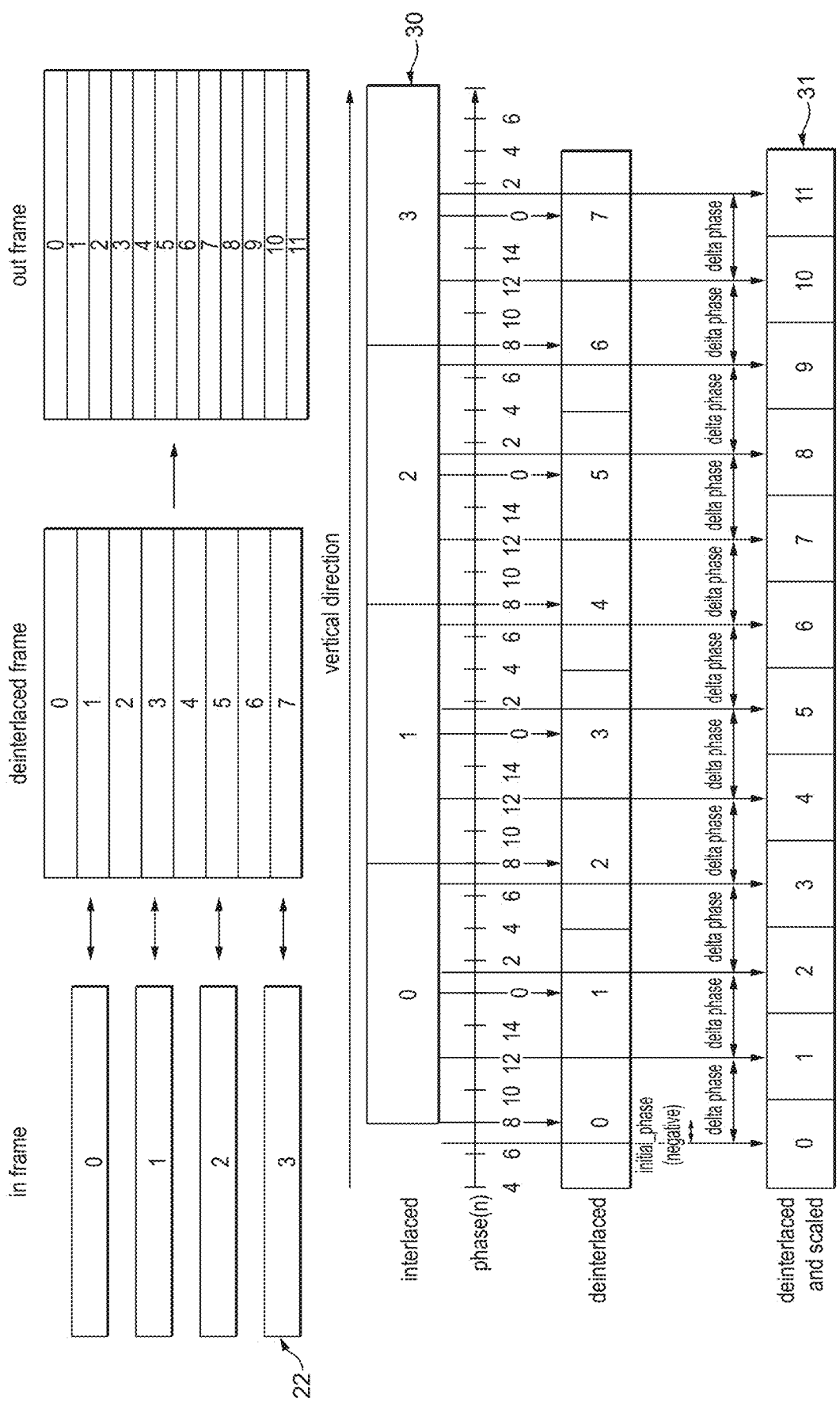
FIG. 18 shows schematically the process of simultaneous de-interlacing and scaling of an even frame using polyphase filtering in accordance with an embodiment of the technology described herein.

As illustrated by FIG. 18, where the input data array comprises an even frame 22 (field) to be de-interlaced and scaled, then the scaling parameters used in the scaling operation are selected to be:

$$\text{delta\_phase} = \frac{1}{2} \cdot \text{scaling\_ratio} \cdot NP, \text{ and}$$

$$\text{initial\_phase} = -\frac{1}{4} \cdot NP + \frac{1}{2} \cdot \text{scaling\_ratio} \cdot NP.$$

In the present embodiment, the mode of operation of the display controller 4 is controlled by an application, e.g. running on the CPU 1, by the application generating instructions which are interpreted by a driver for the display controller 4 (that is running on the CPU 1) to generate appropriate commands to the display controller 4 to operate as required by the application. In particular, where the application requires an input frame to de-interlaced and scaled, then the application generates appropriate instructions which are interpreted by the driver to generate appropriate commands to the display controller 4 to operate in the manner of the present embodiment, i.e. to perform simultaneous de-interlacing and scaling using the scaler 18. The driver determines the appropriate values of the scaling parameters (the delta phase and the initial phase), and sends appropriate commands to the display controller 4 to operate the scaler 18 using the determined scaling parameters.

It will be appreciated from the above that for even frames, the initial phase offset may be negative. Therefore the scaler 18 is configured to be able to handle negative values of initial phase offset. This then facilitates appropriate simultaneous de-interlacing and scaling for even frames (fields).

The above embodiment has been described in terms of simultaneous de-interlacing and scaling of an input data array. It may additionally or alternatively be desired to perform rotation and/or flipping of the input frame prior to display. This is common, for example, in modern mobile devices such as smartphones, tablets, and the like, e.g. where the image displayed on the display is rotated when the mobile device is itself rotated.

Figure 19:
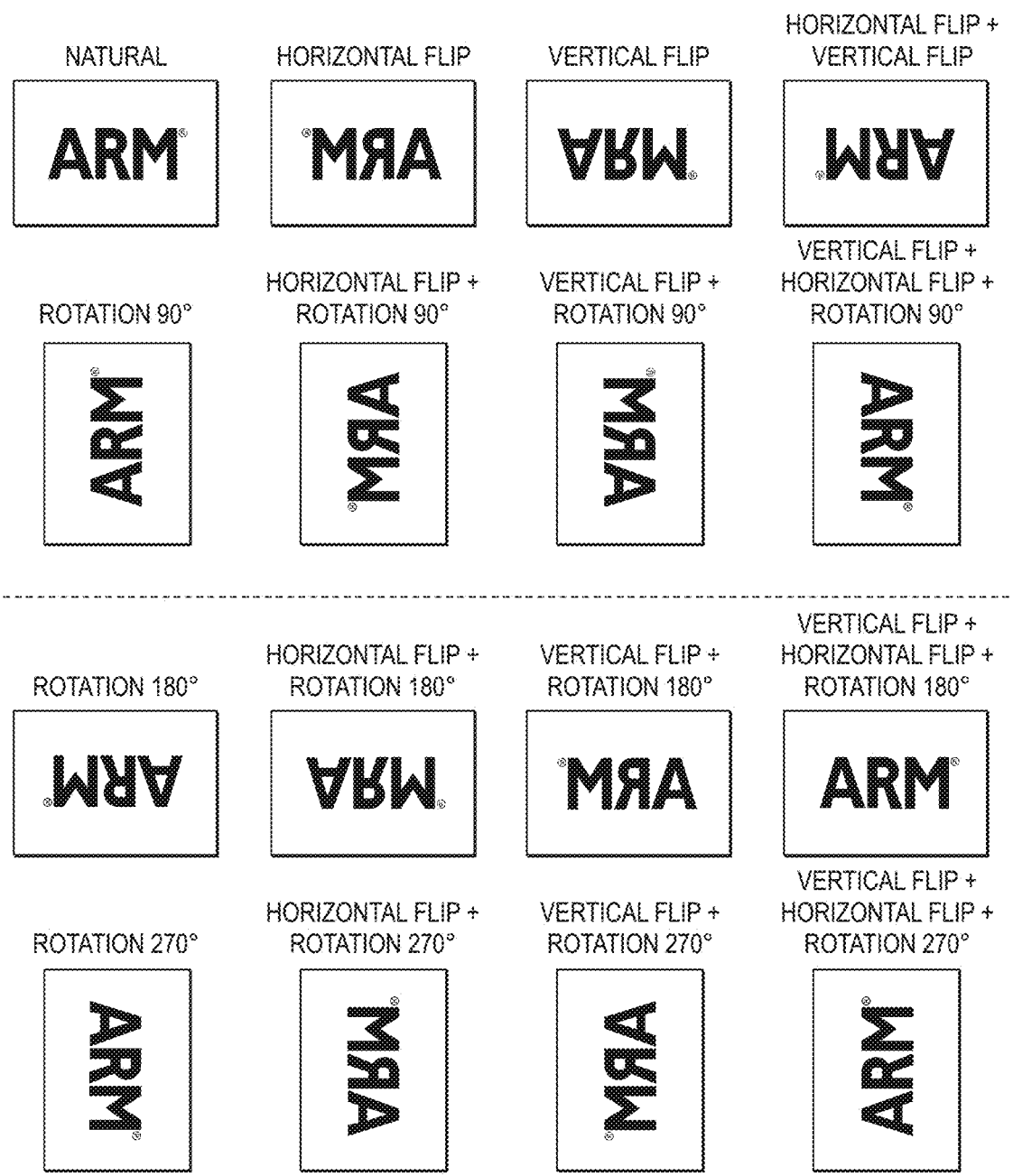
FIG. 19 shows schematically all of the possible combinations of rotating a data array by 0°, 90°, 180° or 270°, and flipping the data array horizontally and/or vertically that may be performed in embodiments of the technology described herein.

FIG. 19 illustrates all the possible combination of rotation and flipping that it may be desired to implement. As shown in FIG. 19, it may be desired to rotate a given frame for display by 0°, 90°, 180°, or 270°. It may additionally or alternatively be desired to flip a frame for display vertical and/or horizontally.

Figure 20:
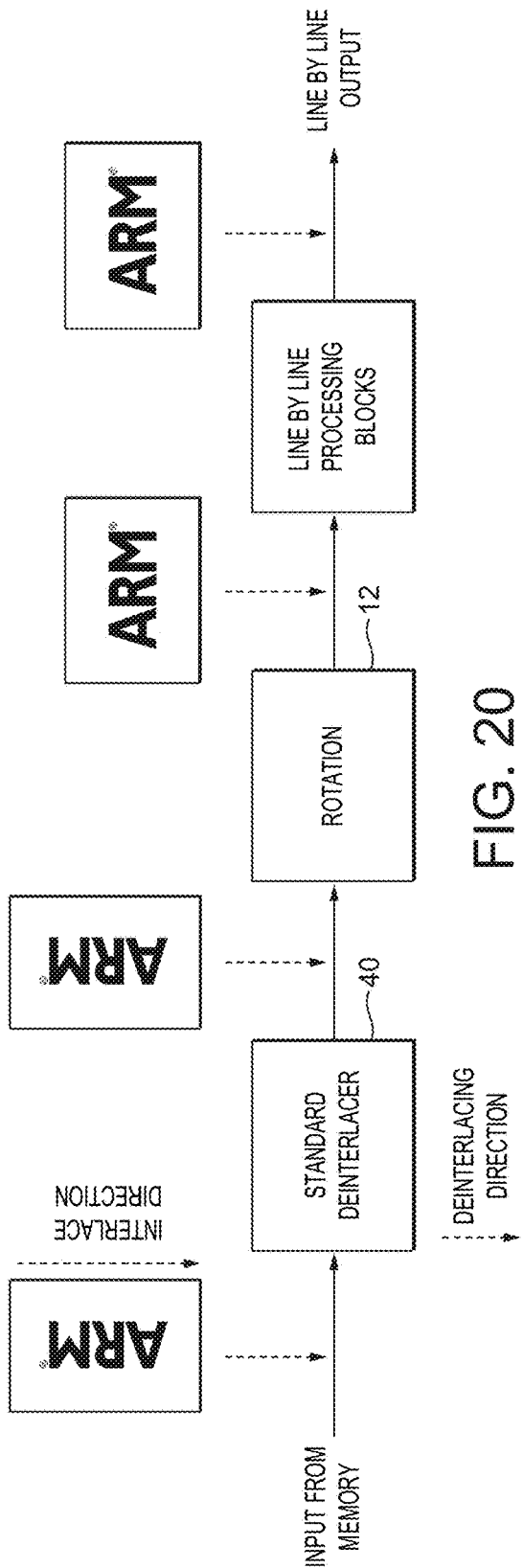
FIG. 20 shows schematically a process of de-interlacing and then rotating an input data array.

As illustrated by FIG. 20, where it is desired to both de-interlace and rotate and/or flip an input data array for display, this is typically done by firstly de-interlacing the input data array using a de-interlacer 40, and then rotating and/or flipping the de-interlaced data array using rotation circuitry 12. The operations are performed in this order because a standard de-interlacer 40 cannot perform de-interlacing on rotated content.

However, performing the operations in this order would mean that where upscaling is to be performed, the upscaling operation would be performed at the beginning of the processing pass, thereby requiring that more data positions are processed by some of the downstream processing blocks (e.g. by the rotator 12). In addition, many standard processing operations operate on a line by line basis (i.e. process each received data array line by line), and in some cases may not therefore be performed between de-interlacing by the de-interlacer 40 and rotation by the rotator 12.

Figure 21:
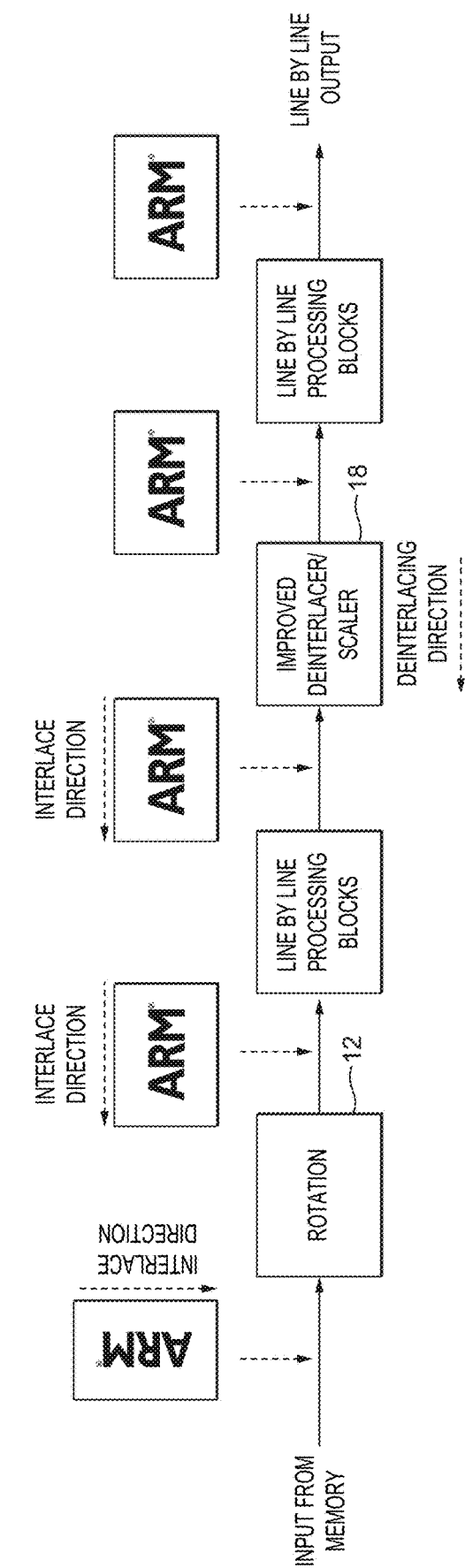
FIG. 21 shows schematically a process of rotating and then de-interlacing an input data array in accordance with an embodiment of the technology described herein.

As illustrated by FIG. 21, in the present embodiment, where it is desired to rotate (e.g. by 90°, 180° or 270°) and/or flip (e.g. horizontally and/or vertically) the input data array (prior to providing the data array to a display for display), this is done prior to the scaling operation, i.e. prior to the scaler scaling the frame so as to produce a de-interlaced and scaled output version of the frame.

This arrangement can reduce the overall processing that must be performed by the display controller 4, e.g. where upscaling is to be performed, and can allow standard processing operations that operate on a line by line basis to be performed between rotation and de-interlacing. Furthermore, the rotation and/or flipping may be carried out when reading the data array from memory by rotation circuitry 12, and the rotated and/or flipped data array may then be provided to the scaler 18, which may be downstream of the rotation and/or flipping stage 12, internally to the display controller 4.

However, this also means that the scaling operation will be performed on a rotated and/or flipped version of the input frame to be de-interlaced.

Figure 22:
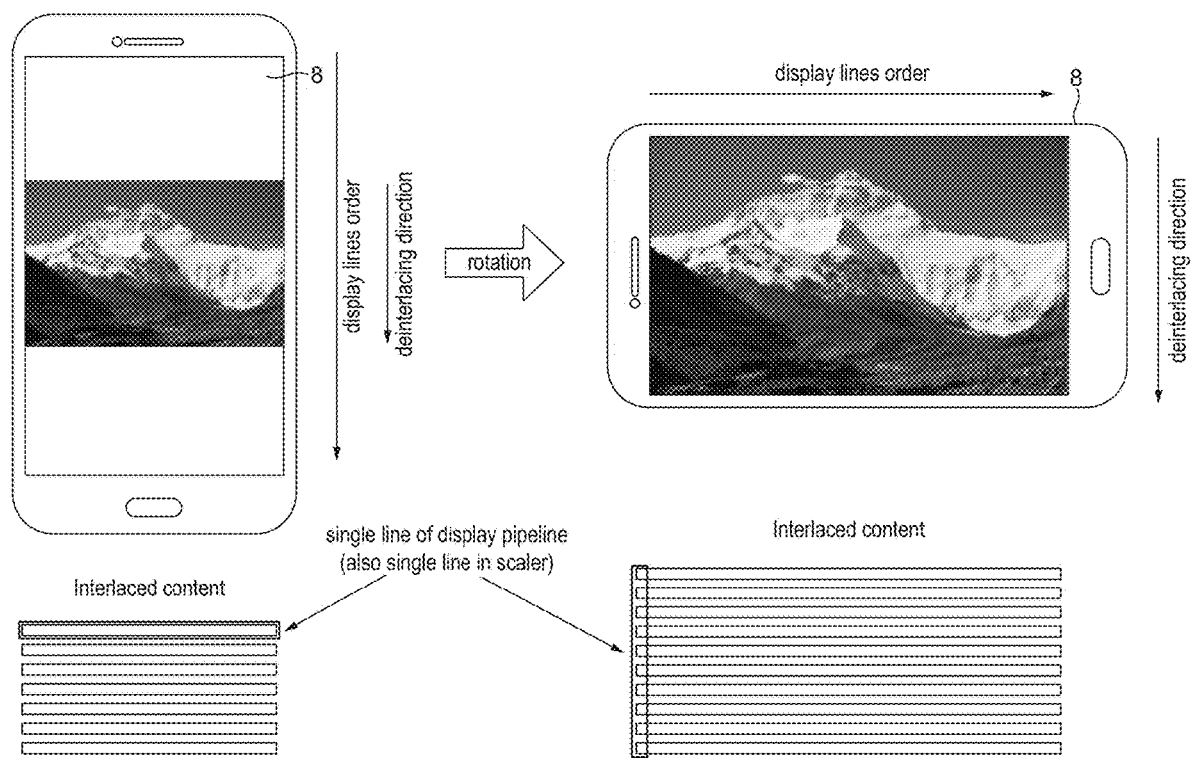
FIG. 22 shows schematically the process of de-interlacing a rotated data array.

This is illustrated by FIG. 22. As show in FIG. 22, where is desired to rotate a frame for display, the direction in which the frame must be de-interlaced may be different to the direction of the display lines of the output display panel 8. Thus, the interlaced frames must be de-interlaced by interpolation in the vertical direction of the display device or by interpolation in the horizontal direction of the display device.

Therefore, in the present embodiment, the scaler 18 is configured so as to be able to perform scaling in both the vertical and horizontal directions. In particular, the scaler 18 is configured so that the initial phase offset and the delta phase are configurable (in the manner descried above) for both the horizontal and vertical directions. This then allows the scaler 18 to perform de-interlacing for any type of rotated and/or flipped input frames and allows more efficient operation of the system.

Furthermore, where the frame is to be de-interlaced by horizontally or vertically scaling the input frame in one direction (dimension), the appropriate side (end) of the input frame (i.e. the original content) that is to be rotated and/or flipped from which the initial phase offset should be defined may be different to the side (end) that would otherwise be required, e.g. for an input frame that is not to be rotated and/or flipped or which is to be rotated and/or flipped differently.

Accordingly, the scaler 18 is configured such that the initial phase offset can be defined with respect to any one of the different sides of the input frame. Thus, for example, the initial phase offset can be defined with respect to the top, the bottom, the left and the right side of the input frame depending on how the input frame is to be rotated and/or flipped.

This allows the scaler 18 to be able to perform appropriate de-interlacing of rotated (and/or flipped) and non-rotated (and/or non-flipped) even or odd frames, thereby facilitating more efficient operation of the display controller when it is desired to both de-interlace and rotate and/or flip a frame for display.

Figure 23:
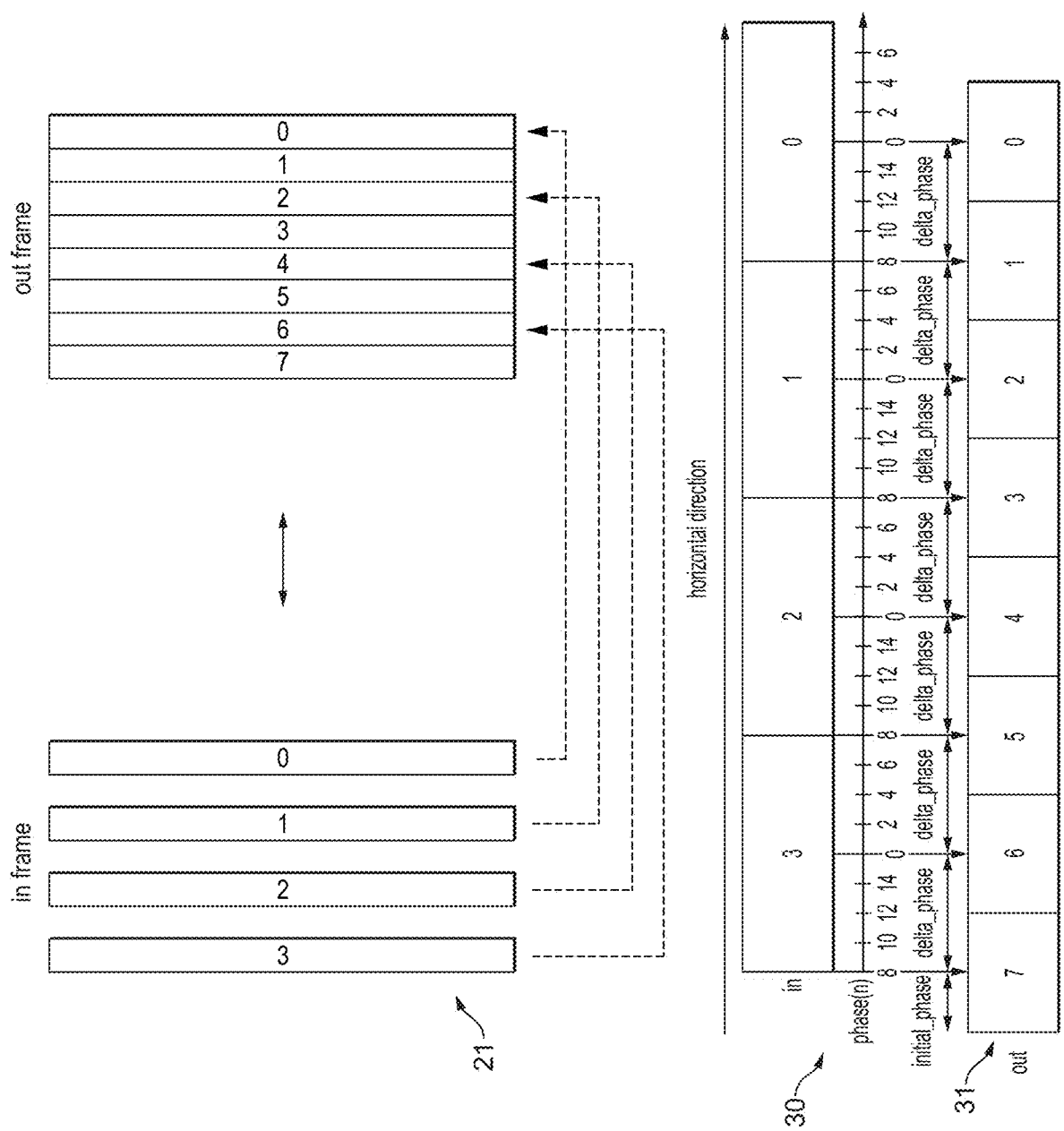
FIG. 23 shows schematically the process of de-interlacing a rotated and vertically flipped odd frame using polyphase filtering, where the de-interlaced output frame has an even number of lines.

FIG. 23 illustrates the process of de-interlacing a rotated and vertically flipped odd interlaced video frame, where the original frame 20 had an even horizontal size. FIG. 23 is based on 16-phase polyphase filter, but can be straightforwardly extended to any number of phases.

As illustrated by FIG. 23, in this case the scaling parameters used in the scaling operation are selected to be:

$$\text{delta\_phase} = \frac{1}{2} \cdot NP, \text{ and}$$

$$\text{initial\_phase} = -\frac{NP}{2}.$$

Note that in this case, this is the same value as is defined by Equation 3 (as for normal upscaling). It can also be seen that the initial phase is negative, and should be computed for the last line, since the data positions from the last line will be processed first in the scaler 18.

Table 1 shows the appropriate edge from which the initial phase should be defined in respect of each of the possible combinations of rotation and/or flipping.

TABLE 1

| Rotation and/or flipping | De-interlacing direction (scaling direction) | Direction for which phase offset is required | Edge from which phase offset is calculated |
|---|---|---|---|
| (Natural orientation) or (vertical flip + horizontal flip + rotation 180°) | vertical | vertical | top |
| (Horizontal flip) or (vertical flip + rotation 180°) | vertical | vertical | top |
| (Vertical flip) or (horizontal flip + rotation 180°) | vertical | vertical | bottom |
| (Vertical flip + horizontal flip) or (rotation 180°) | vertical | vertical | bottom |
| (Rotation 90°) or (vertical flip + horizontal flip + rotation 270°) | horizontal | horizontal | left |
| (Rotation 90° + horizontal flip) or (vertical flip + rotation 270°) | horizontal | horizontal | left |
| (Rotation 90° + vertical flip) or (horizontal flip + rotation 270°) | horizontal | horizontal | right |
| (Rotation 90° + vertical flip + horizontal flip) or (rotation 270°) | horizontal | horizontal | right |

Figure 24:
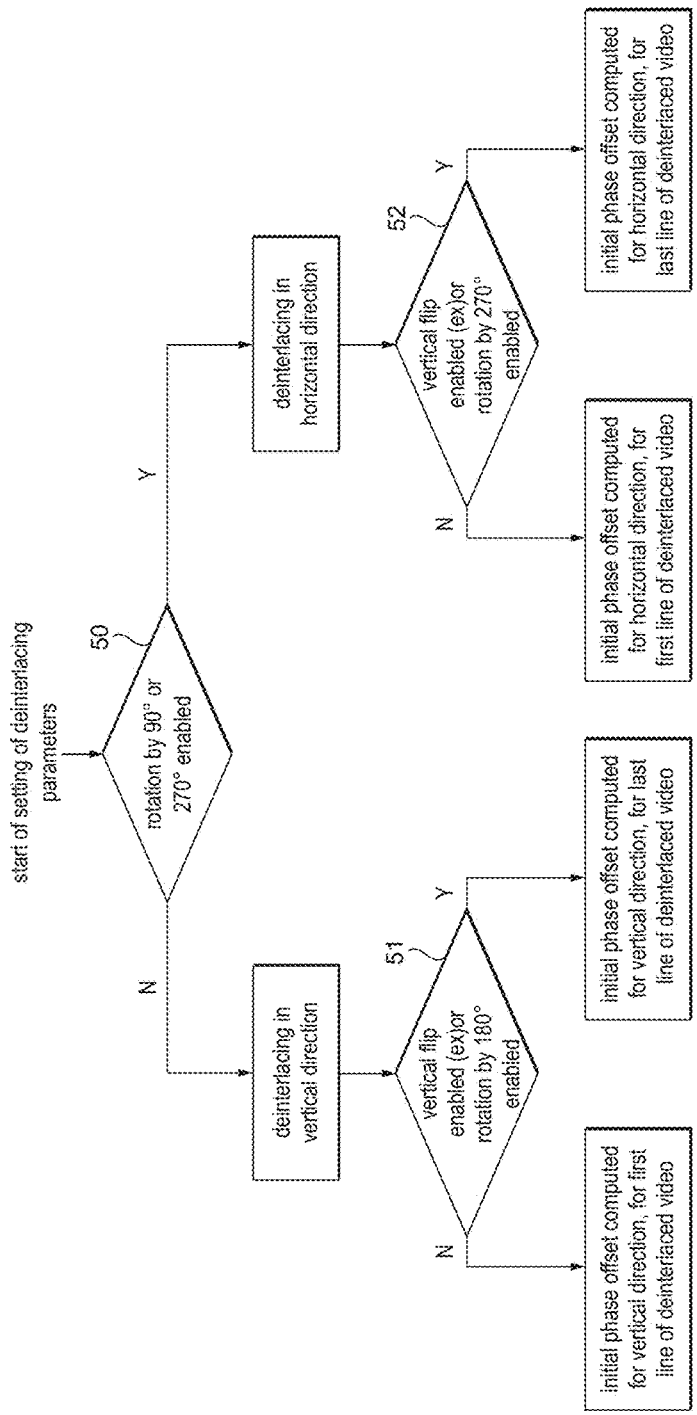
FIG. 24 shows schematically a process for determining the appropriate edge from which an initial phase value should be defined when de-interlacing rotated and/or flipped data arrays in accordance with an embodiment of the technology described herein.

FIG. 24 illustrates a process for determining the appropriate edge from which the initial phase should be defined when de-interlacing rotated and/or flipped data arrays in accordance with the present embodiment. As shown in FIG. 24, it is firstly determined whether or not the input data array has been rotated by 90° or 270° (step 50). In the present embodiment, where the input data array has been rotated by 90° or 270°, de-interlacing must be performed in the horizontal direction, whereas where the input data array is not rotated by 90° or 270° (e.g. is not rotated, or is rotated by 180°), then de-interlacing must be performed in the vertical direction.

Where de-interlacing is to be performed in the vertical direction, it is then determined whether the input data array has been vertically flipped or has been rotated by 180° (step 51). If this is the case, then the initial phase offset to be used for de-interlacing is computed in the vertical direction with respect to the last line of the input data array. If this is not the case, then the initial phase offset to be used for de-interlacing is computed in the vertical direction with respect to the first line of the input data array.

Where de-interlacing is to be performed in the horizontal direction, it is then determined whether the input data array has been vertically flipped or has been rotated by 270° (step 52). If this is the case, then the initial phase offset to be used for de-interlacing is computed in the horizontal direction with respect to the last line of the input data array. If this is not the case, then the initial phase offset to be used for de-interlacing is computed in the horizontal direction with respect to the first line of the input data array.

It will be appreciated from the above that the present embodiment provides an optimisation of an image scaler 18 that facilitates full support of video de-interlacing, and in particular simultaneous de-interlacing and scaling of the de-interlaced video in a single pass, using the same scaler, and support for de-interlacing of rotated and flipped layers in the image scaler 18.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system that includes a scaler operable to scale a received input data array to provide a scaled output version of the input data array, the method comprising:
   when it is desired to produce a de-interlaced and scaled output version of an input data array:
   configuring the scaler with one or more scaling parameters;
   providing the input data array to the scaler; and
   the scaler scaling the input data array using the one or more scaling parameters so as to simultaneously de-interlace and scale the input data array and to thereby produce a de-interlaced and scaled output version of the input data array;
   wherein one or more of the one or more scaling parameters are determined based on the ratio of the size of the de-interlaced and scaled output data array to the size of a de-interlaced version of the input data array; and
   wherein the input data array comprises an even or an odd frame to be de-interlaced for display;
   wherein one or more of the one or more scaling parameters are determined based on whether the input data array comprises an even frame or an odd frame;
   wherein the one or more scaling parameters include an initial offset;
   wherein the initial offset is determined based on whether the input data array comprises an even frame or an odd frame; and
   wherein the scaler is operable to use a negative value of the initial offset when the input data array comprises an even frame.

2. The method of claim 1, wherein the input data array that is provided to the scaler comprises a rotated and/or flipped version of a data array.

3. The method of claim 1, wherein:
   the scaler is operable to scale a received input data array horizontally; and
   the same scaler is operable to scale a received input data array vertically.

4. The method of claim 1, wherein:
   the scaler is operable to use a horizontal initial offset; and
   the same scaler is operable to use a vertical initial offset.

5. The method of claim 1, wherein:
   the scaler is operable to use an initial offset defined with respect to one side of a data array; and
   the scaler is operable to use an initial offset defined with respect to a different side of a data array.

6. A data processing system, the data processing system comprising:
   a scaler operable to scale a received input data array to provide a scaled output version of the input data array; and
   processing circuitry configured, when it is desired to produce a de-interlaced and scaled output version of an input data array, to provide the input data array to the scaler;
   wherein:
   the data processing system is operable to configure the scaler with one or more scaling parameters such that when the scaler scales an input data array, it will produce a de-interlaced and scaled output version of the input data array;
   the scaler is operable to scale a received input data using the one or more scaling parameters array so as to simultaneously de-interlace and scale the input data array, to thereby produce a de-interlaced and scaled output version of the input data array; and
   the data processing system is configured to determine one or more of the one or more scaling parameters based on the ratio of the size of the de-interlaced and scaled output data array to the size of a de-interlaced version of the input data array;
   wherein the input data array comprises an even or an odd frame to be de-interlaced for display;
   wherein the data processing system is configured to determine one or more of the one or more scaling parameters based on whether the input data array comprises an even frame or an odd frame;
   wherein the one or more scaling parameters include an initial offset;
   wherein the data processing system is configured to determine the initial offset based on whether the input data array comprises an even frame or an odd frame; and
   wherein the scaler is operable to use a negative value of the initial offset when the input data array comprises an even frame.

7. The data processing system of claim 6, wherein the input data array comprises a rotated and/or flipped version of a data array.

8. The data processing system of claim 6, wherein:
   the scaler is operable to scale a received input data array horizontally; and
   the same scaler is operable to scale a received input data array vertically.

9. The data processing system of claim 6, wherein:
   the scaler is operable to use a horizontal initial offset; and
   the same scaler is operable to use a vertical initial offset.

10. The data processing system of claim 6, wherein:
    the scaler is operable to use an initial offset defined with respect to one side of a data array; and
    the scaler is operable to use an initial offset defined with respect to a different side of a data array.

11. A non-transitory computer readable storage medium storing computer software code which when executing on a processor performs a method of operating a data processing system that includes a scaler operable to scale a received input data array to provide a scaled output version of the input data array, the method comprising:
    when it is desired to produce a de-interlaced and scaled output version of an input data array:

configuring the scaler with one or more scaling parameters;

providing the input data array to the scaler; and the scaler scaling the input data array using the one or more scaling parameters so as to simultaneously de-interlace and scale the input data array and to thereby produce a de-interlaced and scaled output version of the input data array;

wherein one or more of the one or more scaling parameters are determined based on the ratio of the size of the de-interlaced and scaled output data array to the size of a de-interlaced version of the input data array; and wherein the input data array comprises an even or an odd frame to be de-interlaced for display;

wherein one or more of the one or more scaling parameters are determined based on whether the input data array comprises an even frame or an odd frame;

wherein the one or more scaling parameters include an initial offset;

wherein the initial offset is determined based on whether the input data array comprises an even frame or an odd frame; and wherein the scaler is operable to use a negative value of the initial offset when the input data array comprises an even frame.

* * * * *